US012810184B2

(12) United States Patent
Roy et al.

(10) Patent No.: US 12,810,184 B2
(45) Date of Patent: Nov. 24, 2026

(54) MULTI CLOUD NETWORK VERIFICATION USING QUANTUM MACHINE LEARNING

(71) Applicant: Accenture Global Solutions Limited, Dublin (IE)

(72) Inventors: Debashish Roy, Covina, CA (US); Jefferson Wang, Rolling Hills Estates, CA (US)

(73) Assignee: Accenture Global Solutions Limited, Dublin (IE)

( * ) Notice: Subject to any disclaimer, the term of this patent is extended or adjusted under 35 U.S.C. 154(b) by 837 days.

(21) Appl. No.: 18/144,441

(22) Filed: May 8, 2023

(65) Prior Publication Data

US 2024/0378474 A1 Nov. 14, 2024

(51) Int. Cl.

| | |
|---|---|
| ***G06N 10/20*** | (2022.01) |
| ***G06N 5/01*** | (2023.01) |
| ***G06N 5/022*** | (2023.01) |
| ***G06N 10/00*** | (2022.01) |
| ***G06N 10/60*** | (2022.01) |

(52) U.S. Cl.

CPC ............. *G06N 10/20* (2022.01); *G06N 10/60* (2022.01)

(58) Field of Classification Search

CPC .......... G06N 10/20; G06N 10/60; G06N 5/01; G06N 5/022; G06N 10/00

See application file for complete search history.

(56) References Cited

U.S. PATENT DOCUMENTS 7,869,349 B2 1/2011 Agrawal et al.
10,439,926 B2 10/2019 Horn et al.
11,095,518 B2 8/2021 Zhang et al.
2005/0198269 A1 9/2005 Champagne et al.
2014/0379894 A1* 12/2014 Allen .................. H04L 41/0645 709/224
2021/0014142 A1* 1/2021 Huang .................... H04L 43/10

(Continued)

OTHER PUBLICATIONS

Mari, A., Bromley, T. R., Izaac, J., Schuld, M., & Killoran, N. (2020). Transfer learning in hybrid classical-quantum neural networks. Quantum, 4, 340. (Year: 2020).*

(Continued)

*Primary Examiner* — Daniel T Pellett

*Assistant Examiner* — Hyungjun B Yi

(74) *Attorney, Agent, or Firm* — Seed Intellectual Property Law Group LLP

(57) ABSTRACT

Methods, systems, and apparatus for multi-cloud network verification using quantum machine learning. In one aspect, a method includes obtaining, by a classical computer, network data from the network, wherein the network data comprises network monitoring data and network configuration data; processing, by the classical computer, the network data to generate data that represents invariant properties of the network; processing, by the classical computer, the network data to generate a multi-layer graph model of the network; processing, by a quantum computer, the data that represents invariant properties of the network and the multi-layer graph model of the network using a quantum machine learning decision engine to select one or more network verification mechanisms for the network; and initiating a live check of the network using the verification mechanisms to validate the network.

20 Claims, 12 Drawing Sheets

(56) References Cited

U.S. PATENT DOCUMENTS

2021/0184953 A1* 6/2021 Huang ................ G06F 9/45558

OTHER PUBLICATIONS

Javed, Y., Felemban, M., Shawly, T., Kobes, J., & Ghafoor, A. (2020). A partition-driven integrated security architecture for cyberphysical systems. Computer, 53(3), 47-56. (Year: 2020).*

Minimum spanning trees. (Apr. 29, 2015). In 15-210: Parallel and sequential data structures and algorithms (Chapter 18). Carnegie Mellon University. (Year: 2015).*

Ramasamy, H. V., Tsao, C. L., Pfitzmann, B., Joukov, N., & Murray, J. W. (2011). Towards automated identification of security zone classification in enterprise networks. In Workshop on Hot Topics in Management of Internet, Cloud, and Enterprise Networks and Services (Hot-ICE 11). (Year: 2011).*

Pang, W., Panda, S., Amjad, J., Diot, C., & Govindan, R. (2022). {CloudCluster}: Unearthing the functional structure of a cloud service. In 19th USENIX Symposium on Networked Systems Design and Implementation (NSDI 22) (pp. 1213-1230). (Year: 2022).*

Mitarai, K., Negoro, M., Kitagawa, M., & Fujii, K. (2019). Quantum circuit learning. Physical Review A, 98(3), 032309. (Year: 2019).*

Qi, Y., Jiang, R., Jia, Y., & Li, A. (2020). Attack analysis framework for cyber-attack and defense test platform. electronics, 9(9), 1413. (Year: 2020).*

Bordes, A., Usunier, N., Garcia-Duran, A., Weston, J., & Yakhnenko, O. (2013). Translating embeddings for modeling multi-relational data. Advances in neural information processing systems, 26. (Year: 2013).*

Ferriol-Galmés, M., Suárez-Varela, J., Paillissé, J., Shi, X., Xiao, S., Cheng, X., . . . & Cabellos-Aparicio, A. (2022). Building a digital twin for network optimization using graph neural networks. Computer Networks, 217, 109329. (Year: 2022).*

Chen, Y., Wang, C., & Guo, H. (2022). Novel architecture of parameterized quantum circuit for graph convolutional network. arXiv preprint arXiv:2203.03251. (Year: 2022).*

DataScienceCentral.com [online], "Data Animation: Much Easier than you Think!," Feb. 2, 2022, retrieved on Aug. 18, 2023, retrieved from URL<https://www.datasciencecentral.com/data-animation-much-easier-than-you-think/>, 12 pages.

GraphCommons.com [online], "A new perspective on your data," available on or before Sep. 25, 2022, via Internet Archive: Wayback Machine URL<https://web.archive.org/web/20220925114057/https://graphcommons.com/features>, retrieved on Aug. 18, 2023, retrieved from URL<https://web.archive.org/web/20220925114057/https://graphcommons.com/features>, 4 pages.

Medium.com [online], "Awesome Machine Learning Visualizations," Feb. 4, 2020, retrieved on Aug. 18, 2023, retrieved from URL<https://medium.com/analytics-vidhya/awesome-machine-learning-visualizations-5208f1617ec5>, 15 pages.

PaulVanDerLaken.com [online], "Animated Machine Learning Classifiers," available on or before Mar. 14, 2020 via Internet Archive: Wayback Machine URL<https://web.archive.org/web/20200314151445/https://paulvanderlaken.com/2020/01/20/animated-machine-learning-classifiers/>, retrieved on Aug. 18, 2023, retreived from URL<https://paulvanderlaken.com/2020/01/20/animated-machine-learning-classifiers/>, 15 pages.

TowardsDataScience.com [online], "How to Create Mathematical Animations like 3Blue1Brown Using Python," Apr. 5, 2021, retrieved on Aug. 18, 2023, retrieved from URL<https://towardsdatascience.com/how-to-create-mathematical-animations-like-3blue1brown-using-python-f571fb9da3d1>, 27 pages.

* cited by examiner

MULTI CLOUD NETWORK VERIFICATION USING QUANTUM MACHINE LEARNING

TECHNICAL FIELD

The present invention relates to network verification and quantum computing.

BACKGROUND

Routing and forwarding in networks are controlled using low-level configuration on individual routers. Network verification can be used to analyze these configurations in order to verify that they meet a given specification of the intended end-to-end network behavior. Some network verification tools model network behavior as satisfiability modulo theories constraints or as graphs. Other techniques use explicit-state model checking. These network verification tools cannot scale to large networks, because of the complexity of jointly reasoning about the behaviors of all nodes in the network.

Some techniques have been developed to analyze low-level router configurations in order to verify that they conform to the specified network behavior for end-to-end communications. Routing and forwarding in networks is currently controlled through low-level configuration on individual routers. However, these techniques are limited since they model and reason about network behavior monolithically. Specifically, they analyze the network and its configuration as a whole, exhaustively exploring all possible control-plane behaviors of the network that are induced by the complex interactions among all configuration directives and protocols. Because entire networks must be analyzed as a unit, these methods are severely limited in their practical applicability.

SUMMARY

This specification describes multi-cloud network verification using quantum machine learning.

In general, one innovative aspect of the subject matter described in this specification can be implemented in a method for verifying a network, the method including obtaining, by a classical computer, network data from the network, wherein the network data comprises network monitoring data and network configuration data; processing, by the classical computer, the network data to generate data that represents invariant properties of the network; processing, by the classical computer, the network data to generate a multi-layer graph model of the network; processing, by a quantum computer, the data that represents invariant properties of the network and the multi-layer graph model of the network using a quantum machine learning decision engine to select one or more network verification mechanisms for the network; and initiating a live check of the network using the verification mechanisms to validate the network.

Other implementations of this aspect include corresponding classical, quantum or hybrid classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the multi-layer graph model of the network comprises a local check graph, a minimal local check graph, and a minimal global check graph.

In some implementations processing the network data to generate the local check graph comprises: generating a graph that represents the network, wherein nodes in the graph represent physical or virtual machines included in the network and edges between nodes represent respective connectivities between physical or virtual machines; assigning each node in the graph to a respective network zone of multiple network zones; and partitioning the graph into multiple disjoint subgraphs, wherein each disjoint subgraph corresponds to a respective network zone.

In some implementations processing the network data to generate the minimal local check graph comprises: identifying a minimum set of edges that connects all nodes in the graph; and removing edges from the local check graph that are not included in the minimum set of edges.

In some implementations processing the network data to generate the minimal global check graph comprises: identifying edges that provide inter-zone connectivity between the nodes in the graph; and removing edges from the graph that are not included in the identified edges.

In some implementations processing the data that represents invariant properties of the network and the multi-layer graph model of the network using a quantum machine learning decision engine to select one or more network verification mechanisms for the network comprises: encoding the data that represents invariant properties of the network and the multi-layer graph model of the network as quantum data; applying a trained quantum circuit model to the quantum data to extract dominant features in the network data; and processing the dominant features in the network data using a trained classical machine learning model to select the network verification mechanisms.

In some implementations encoding the data that represents invariant properties of the network and the multi-layer graph model of the network as quantum data comprises: generating a zone-centric relationship matrix, a data tier-centric relationship matrix, and a time window centric relationship matrix using the invariant properties of the network and the multi-layer graph model of the network; mapping the zone-centric relationship matrix, data tier-centric relationship matrix, and time window centric relationship matrix to a quantum circuit, wherein parameters of the quantum circuit correspond to entries of each of the zone-centric relationship matrix, data tier-centric relationship matrix, and time window centric relationship matrix; and applying the quantum circuit to a register of initialized qubits to prepare a quantum state that encodes the data that represents invariant properties of the network and the multi-layer graph model of the network.

In some implementations the method further comprises normalizing each of the zone-centric relationship matrix, data tier-centric relationship matrix, and time window centric relationship matrix, wherein the normalized zone-centric relationship matrix, data tier-centric relationship matrix, and time window centric relationship matrix are mapped to the quantum circuit.

In some implementations encoding the data that represents invariant properties of the network and the multi-layer graph model of the network as quantum data comprises: applying a quantum data encoding circuit to a register of initialized qubits to prepare a quantum state that encodes information included in the data that represents invariant properties of the network and the multi-layer graph model of the network, wherein the quantum data encoding circuit is determined based on the data that represents invariant properties of the network and the multi-layer graph model of the network.

In some implementations the quantum circuit model comprises a parameterized quantum circuit that has been configured through training to extract dominant features from a data input using a hybrid classical-quantum variational algorithm.

In some implementations the data that represents invariant properties of the network is clustered in three dimensions, the dimensions comprising network zones, network data tiers, and network time windows.

In some implementations the invariant properties of the network are represented as knowledge graph, wherein vertices included in the knowledge graph represent network nodes, zones, network data tiers, or network connectivity in predefined time windows, and edges between vertices represent relationships between the vertices.

In some implementations processing the network data to generate data that represents invariant properties of the network comprises: classifying nodes of the network as belonging to one of multiple network zones; classifying nodes of the network as belonging to one of multiple network data tiers; and identifying connectivity patterns of each node in the network with respect to multiple predefined time windows.

In some implementations processing the network data to generate data that represents invariant properties of the network further comprises: processing data representing the classified nodes and identified connectivity patterns using a translational distance model to identify relationships between the classified nodes and identified connectivity patterns; and generating a knowledge graph using the classified nodes, identified connectivity patterns, and relationships between the classified nodes and identified connectivity patterns, wherein vertices included in the knowledge graph represent network nodes, zones, data tiers, or time windows and edges between vertices represent relationships between the vertices.

In some implementations the method further comprises receiving network validation results of the live check of the network; inferring a network status using the selected network verification mechanisms; generating a network verification output that indicates whether problems or failures still exist in the network using the network validation results of the live check and the inferred network status; and processing the network verification output to determine whether to initiate one or more remedial actions on the network.

The subject matter described in this specification can be implemented in particular ways so as to realize one or more of the following advantages.

Conventional network control plane verification techniques (i.e., different to the verification techniques described in this disclosure) cannot scale to large networks because of the complexity of jointly reasoning about the behaviors of all nodes in the network. Some techniques have been developed to analyze low-level router configurations in order to verify that they conform to the specified network behavior for end-to-end communications. Routing and forwarding in networks is currently controlled through low-level configuration on individual routers.

However, these conventional techniques share an important limitation: they model and reason about network behavior monolithically. Specifically, they analyze the network and its configuration as a whole, exhaustively exploring all possible control-plane behaviors of the network that are induced by the complex interactions among all configuration directives and protocols. Because entire networks must be analyzed as a unit, these techniques are severely limited in their practical applicability.

The network verification techniques described in this specification overcome these limitations and other technical challenges.

For example, the presently described network verification techniques include an invariant analytics and decision-making process that applies a quantum machine learning decision engine to a selective multi-layer graph architecture. The presently described quantum machine learning decision engine provides several technical advantages over traditional classical methods. For example, the invariant analytics and decision-making process is able to process the large volume of network data generated from large multi-cloud networks and extract important information such as network anomalies. As another example, the quantum machine learning decision engine can extract features from network data that are not accessible to classical methods. This can lead to a more accurate classification of the data. As another example, the quantum machine learning decision engine is scalable, meaning that it can be trained on larger datasets and applied to larger networks. As another example, the quantum machine learning decision engine is computationally efficient, meaning that it can process data faster than traditional classical methods.

In addition, some network management tools create frequent changes in the overall network configuration. Many conventional network verification techniques cannot keep up with such changes and are not suitable for such settings since they are developed using static configuration data. However, the presently described network verification techniques are able to perform network configuration inference in real-time using machine learning based knowledge graph formation. The presently described network verification techniques are therefore suitable for dynamic networks where changes in the overall network configuration can frequently occur.

In addition, in large multi-cloud networks invariants properties of the network can be private to various software defined network components and are therefore unknown. The presently described network verification techniques address this challenge using a three-layer zoning approach to network verification.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems for multi-cloud network verification using quantum machine learning. Monitoring and configuration data generated by the multi-cloud network is processed to generate a multi-layer graph model for the network. The multi-layer graph model preserves information about the network but reduces the observation space of the network. The monitoring and configuration data is also processed to generate network invariant data that includes an entity space representation of network zones and a relation space representation of network data exchanges and timings of the data exchanges. The network data is encoded as quantum data by mapping the multi-layer graph model and network invariant data to a configuration of quantum gate parameters in a quantum circuit and applying the quantum circuit to an initialized quantum state. A trained quantum circuit model can then process the quantum data to extract dominant features of the network data, which in turn is used to select appropriate verification mechanisms for the multi-cloud network.

Figure 1:
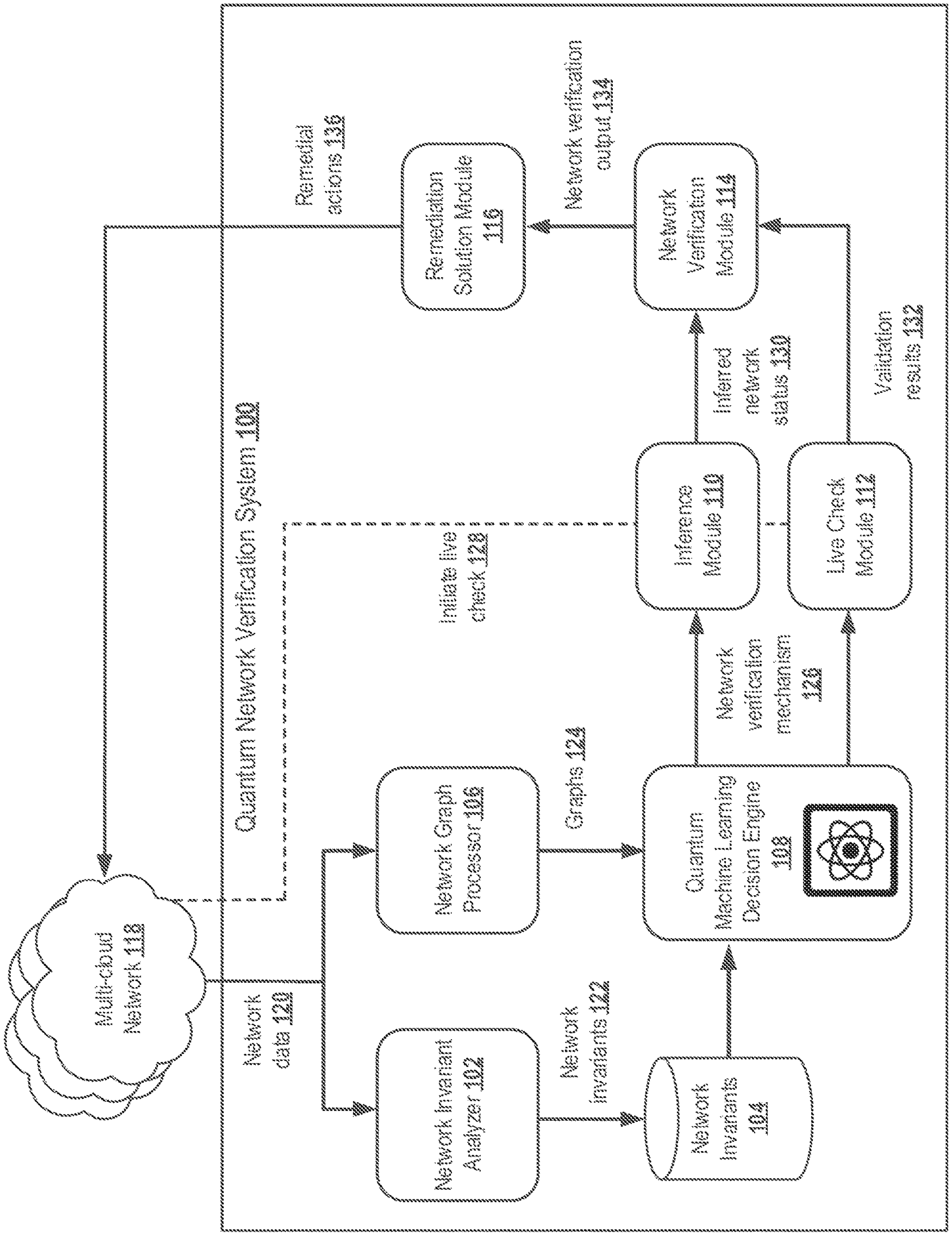
FIG. 1 is a block diagram of an example quantum network verification system.

FIG. 1 is a block diagram of an example quantum network verification system 100. The system 100 is an example of a system implemented as computer programs on one or more classical and quantum devices in one or more locations, in which the systems, components, and techniques described in this specification can be implemented.

The system 100 includes a network variant analyzer 102, a network invariants database 104, a network graph processor 106, a quantum machine learning decision engine 108, an inference module 110, a live check module 112, a network verification module 114, and a remediation solution generator 116. Components of the system 100 can be in data communication with each other, e.g., through a communication network such as a local area network or wide area network.

The network variant analyzer 102 is configured to receive network data 120 generated by a multi-cloud network 118. The network data 120 can include network configuration data, monitoring data, and SD-WAN configuration data collected by network management software systems included in the multi-cloud network 118. The network variant analyzer 102 is configured to process the received network data 120 to identify invariant properties of the multi-cloud network (referred to hereafter as "network invariants"). Network invariants are properties of the multi-cloud network that are (or should be) maintained over time. Maintaining network invariants improves the stability of the multi-cloud network.

The network invariants identified by the network variant analyzer 102 can be categorized as one of multiple types of invariant properties. For example, the network invariants can include properties of the multi-cloud network that relate to network connectivity. A network is referred to as fully connected if there is a path between any two nodes in the network. If a node becomes disconnected from the network, it is no longer able to communicate with other nodes. This can affect the functionality and stability of the network. Network connectivity is therefore a property of the network that should be maintained over time.

As another example, the network invariants can include properties of the multi-cloud network that relate to network reachability. A network is referred to as having reachability if all nodes in the network can be reached from any other node. If a node is unreachable, it may as well not exist for the purposes of communication. This can affect the functionality and stability of the network, e.g., if too many nodes become unreachable. Network reachability is therefore a property of the network that should be maintained over time.

Network connectivity and network reachability are related but distinct concepts in the context of computer networks. Network connectivity refers to the presence of a valid connection between two devices on a network. For example, if two computers are both connected to the same network and can communicate with each other, there is network connectivity between them. Network connectivity is a property of the network infrastructure and the devices that are connected to it. Reachability, on the other hand, refers to the ability of one device to access another device on the network, and receive a response. This includes not just the existence of a connection, but also the ability of packets to be successfully transmitted and received over that connection. Reachability is a property of the communication between the devices, and may be influenced by factors such as network congestion, firewall rules, and routing policies. In other words, network connectivity refers to the presence of a path for communication, while reachability refers to the ability to actually communicate over that path. Therefore, network connectivity and network reachability are related concepts, but network connectivity is a property of the network and devices, while reachability is a property of the communication between devices on the network.

As another example, the network invariants can include properties of the multi-cloud network that relate to network fairness. A network is referred to as being fair if nodes in the network have a similar chance of receiving messages. If one node is always chosen to receive a message, while other nodes are never chosen, then the network is said to be unfair. This can affect the functionality and stability of the network, e.g., if some nodes are overworked and cannot process received messages in a timely manner whilst other nodes are idle. Network fairness is therefore a property of the network that should be maintained over time.

The network variant analyzer 102 includes a machine learning module that is configured through training to identify network invariants for the multi-cloud network 118. For example, the network variant analyzer 102 can include a classification module, clustering module, and network connection weight module that are configured to process received network data 120 to generate classification, clustering, and network time window analysis data, respectively, which can be combined by a translational distance model to generate a knowledge graph that represents the identified network invariants 122. An example network variant analyzer 102 and operations performed by the example network variant analyzer 102 are described in more detail below with reference to FIG. 2A.

The network invariants 122 identified by the network variant analyzer 102 are stored in a network invariant knowledge base 104, e.g., as a knowledge graph as described below with reference to FIGS. 2A and 2B. Network invariants 122 stored in the network invariant knowledge base 104 can be accessed by or transmitted to the quantum machine learning decision engine 108.

The network graph processor 106 is also configured to receive the network data 120 generated by the multi-cloud network 118. The network graph processor 106 is configured to process the network data 120 using graph analysis techniques to generate graph data 124 for multiple graphs that represent the network (or portions of the network) and properties of the network. The multiple graphs include a local check graph, a minimal local check graph, and a minimal global check graph. These graphs encode important information about the multi-cloud network 118, yet reduce the total observation space, e.g., compared to the raw network data 120.

For example, the local check graph models the network as a graph of nodes and edges, where graph nodes that correspond to network nodes in a same zone are partitioned to form respective subgraphs. The local check graph therefore provides an understanding of how many network nodes there are in the network and how the network nodes are organized. The minimal local check graph is a minimum node/vertex model of the local check graph and includes a minimum number of edges needed to connect all the nodes in the graph. The minimal local check graph provides an understanding of the minimum connectivity required between each partitioned zone of the local check graph. The minimal global check graph is an inter-zone connectivity graph for various network zones that enable global communication within the network. The minimal global check graph provides an understanding of the critical inter zone connectivity in the network, where an impact to these critical inter zone connections will have broad impact to the network. An example network graph processor 106 and operations performed by the example network graph processor 106 are described in more detail below with reference to FIGS. 3 and 4A-D.

The network graph processor 106 is configured to provide the graph data 124 to the quantum machine learning decision engine 108. The quantum machine learning decision engine 108 is configured to process the graph data 124 as well as the network invariants 122 stored in the network invariant knowledge base 104 to select one or more network verification mechanisms 126 for the multi-cloud network 118. The quantum machine learning decision engine 108 includes a quantum circuit model and a classical data processing unit. The quantum circuit model is used to extract dominant network features from the graph data 124 and network invariants 122. The classical data processing unit is used to process the extracted dominant network features and output appropriate network verification mechanisms 126 for the multi-cloud network 118. The verification mechanisms 126 can include verification mechanisms from multiple predefined categories/types of verification mechanisms. For example, the verification mechanisms can include mechanisms for monitoring/verifying network service zones, e.g., data forwarding graphs of the network, lists of users using the service, network service status, or network zone alignment. As another example, the verification mechanisms can include mechanisms for monitoring/verifying network data, e.g., network switch status, network data links, network flow rules in switches, and network data exchange patterns. As another example, the verification mechanisms can include mechanisms for monitoring/verifying network application timings, e.g., network time window monitoring, network activity monitoring, network data volume or network peak window.

In some implementations the output can also indicate which verifications mechanisms should be physically verified and which should be inferred. For example, the verification mechanisms can correspond to 100 invariants, each of which need to be checked in order to determine the network stability. These verification mechanisms can be categorized as live check or inference, e.g., 20% can be categorized as live check and 80% as inference by the machine learning decision engine. Balancing physical checks and inferred checks in this manner can reduce overall processing time and enable the system to more quickly determine a status of a large network. An example quantum machine learning decision engine 108 and operations performed by the quantum machine learning decision engine 108 are described in more detail below with reference to FIGS. 5 and 6.

The quantum machine learning decision engine 108 is configured to provide respective selected verification mechanisms 126 to the inference module 110 and the live check module 112. The inference module 110 is configured to infer a network status 130 from the network invariant knowledge base 108 and graphs output by the network graph processor 106.

The live check module 112 is configured to receive respective network verification mechanisms 126 output by the quantum machine learning decision engine 108 and initiate a live check 128 according to the verification mechanisms to validate the network configuration. Since network validation of a multi-cloud network is a complex task, in some implementations the live check of the multi-cloud network may not resolve all problems or failures occurring the multi-cloud network. For example, a portion of the multi-cloud network may require an auto healing solution. Therefore, the live check module 112 is configured to provide results of the live check 132 to the network verification module 114 for processing.

The network verification module 114 is configured to use the inferred network status 130 (received from the inference module 110) and the results of the validation 132 (received from the live check module 112) to generate a network verification output 134 that is provided to an automated remediation solution module 116. The network verification output 134 includes information that indicates whether problems or failures still exist in the multi-cloud network, e.g., after the live and inferred check have been completed.

The remediation solution module 116 is configured to receive the network verification output 134 from the network verification module 114 and process the network verification output 134 to determine whether an auto-heal/remediation solution is required to further improve the functionality and operational status of the multi-cloud network. If the remediation solution module 116 determines that an auto-heal/remediation solution is required, the remediation solution module 116 initiates one or more remedial actions 136 on the multi-cloud network 118. Example remedial actions include reconfiguring associated SDN applications, up-linking power reduction on access points, or application reconfigurations.

Figure 2A:
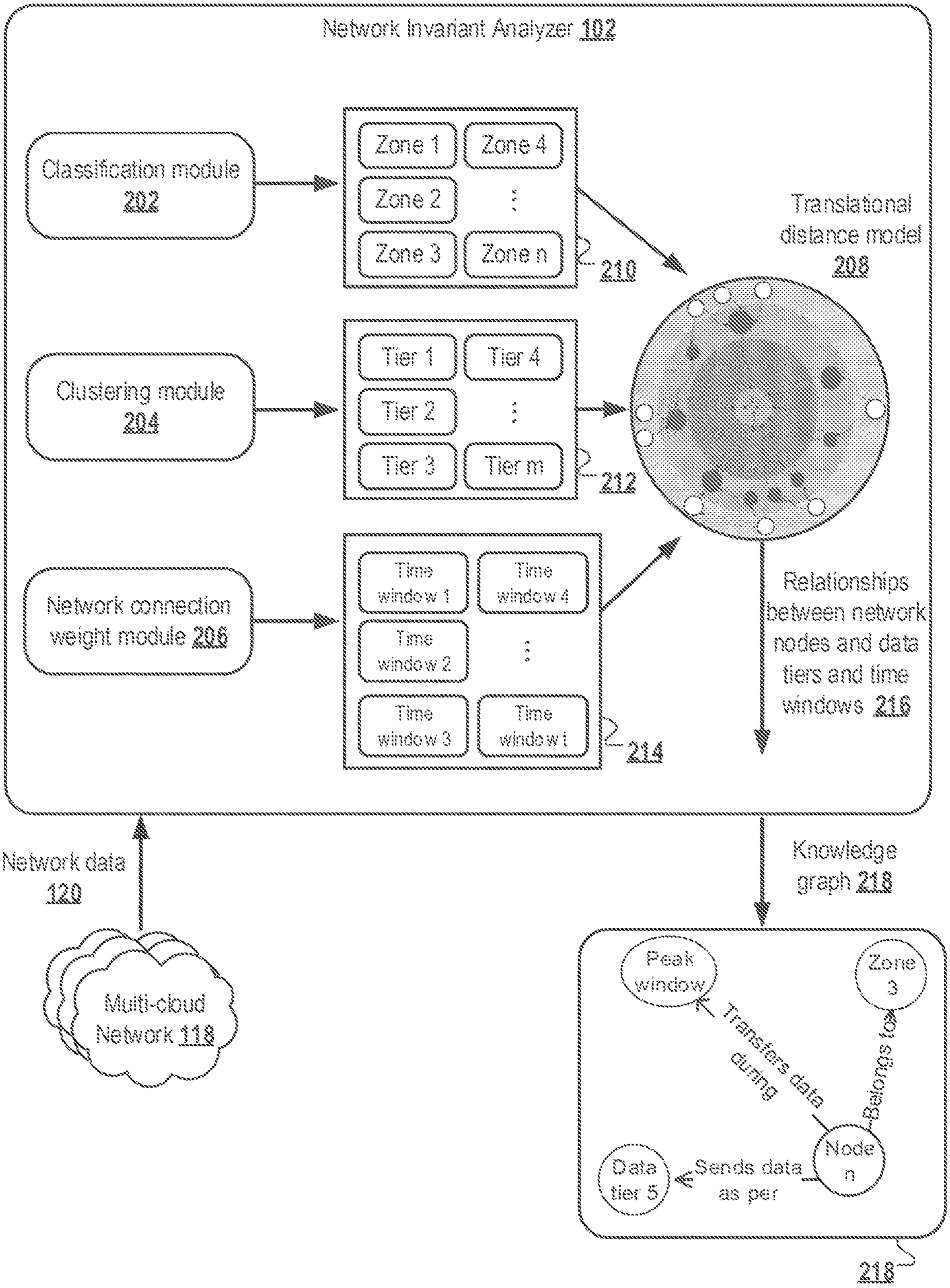
FIG. 2A is a block diagram of an example network variant analyzer.

FIG. 2A is a block diagram of an example network variant analyzer 102. As described above with reference to FIG. 1, the example network variant analyzer 102 includes a classification module 202, a clustering module 204, a network connection weight module 206, and a translational distance model 208. Components of the network variant analyzer 102 can be in data communication with each other, e.g., through a communication network such as a local area network or wide area network.

The example network variant analyzer 102 is configured to receive network data 120 from a multi-cloud network 118. The network data 120 can include monitoring data, which in turn can include data obtained using network monitoring software that monitors a current operational status of the multi-cloud network. For example, the network data 120 can include data representing a current traffic flow in the multi-cloud network and data identifying currently malfunctioning network devices or overloaded resources.

The classification module 202 is a machine learning module that is configured, through training, to receive the network data 120 and process the network data 120 to classify nodes of the multi-cloud network as belonging to one of multiple network zones 210. For example, the classification module 202 can be configured to identify information such as network node IP addresses, network node MAC addresses, routers associated with the network nodes, etc., and use the information to identify multiple network zones. The classification module 202 can then classify the network nodes as belonging to one or more of the network zones. The number and size of the multiple network nodes output by the classification module 202 can vary and depend on properties of the multi-cloud network, e.g., the size, complexity, and configuration of the multi-cloud network.

The clustering module 204 is a machine learning module that is configured, through training, to receive the network data 120 and process the network data 120 to cluster nodes of the multi-cloud network as belonging to one of multiple clusters 212. To process the network data 120 the clustering module 204 can implement one or more clustering algorithms, e.g., K-means clustering, mean-shift clustering, or density-based spatial clustering of applications with noise (DBSCAN), etc. The clusters correspond to different data tiers. A data tier is a collection of network nodes with a same data role and that typically shares a same hardware profile, e.g., content tiers that include nodes that handle indexing and query loading for content such as a product catalog, hot tiers that include nodes that handle indexing loading for time series data such as logs or metrics and hold recent, most-frequently-accessed data, or cold tiers that include nodes that hold time series data that is access infrequently and not usually updated. The clustering module 204 can then classify the network nodes as belonging to one or more of these data tiers. The number and size of the multiple clusters 212 output by the clustering module 204 can vary and depend on properties of the multi-cloud network, e.g., the size, complexity, and configuration of the multi-cloud network. In some implementations the number of data tiers 212 can be larger than the number of network zones 210.

The network connection weight module 206 is a machine learning module that is configured, through training, to receive the network data 120 and process the network data 120 to identify connectivity patterns 214 of each node with respect to predefined time windows, e.g., off-peak time windows, on-peak time windows, or super off-peak time windows.

A connectivity pattern in network data refers to the relationships between the nodes (e.g. individuals, organizations, websites, etc.) in the network. These patterns can be represented using various types of network data, such as: an adjacency matrix (which is a square matrix that represents the connections between nodes in a network, where each row and column corresponds to a node, and the presence or absence of a connection is indicated by a 1 or 0, respectively), an edge list (which is a list of pairs of nodes that are connected in a network), a node-edge list (which is a list of nodes, each with a list of edges that connect to that node), or a graph (which is a mathematical representation of a network as a set of vertices (nodes) and edges connecting them). These different types of network data can be used to uncover various aspects of the connectivity pattern in a network, such as the number of connections each node has, the presence of clusters or communities, the centrality of certain nodes, and the overall structure of the network.

A time window in network analysis refers to a specific time period during which the relationships between nodes in a network are recorded. A connectivity pattern in a network can be studied over a time window by analyzing how the relationships between nodes change over time. For example, in a social network, the connections between individuals may change as people make new friends, end friendships, or move in and out of close proximity. By dividing the network into time windows and examining the relationships between nodes within each window, insights into the dynamics of the network and how the connectivity pattern changes over time can be obtained. Additionally, by comparing the connectivity patterns in different time windows, trends and changes in the network over time can be observed. For example, the network can become more densely connected, or new clusters or communities can emerge. Overall, a time window is an important tool in network analysis as it allows for the examination of the dynamics of the network and provides an understanding as to how the connectivity pattern changes over time. The length of the time windows can vary, e.g., based on the length of time required to explain patterns in the data.

The classification module 202, clustering module 204, and network connection weight module 206 can each process the network data 120 independently from one another to uncover different unknown properties of the network nodes.

The classification module 202, clustering module 204, and network connection weight module 206 can each provide the respective output data 210, 212, and 214 to the translational distance model 208 for processing. The translational distance model 208 is configured to process the received data to identify relationships 216 between the output data 210, 212, and 214. For example, the translational distance model 208 can be configured to link network zones included in the zones 210 output by the classification module 202 to different data tiers included in the data tiers 212 output by the clustering module 204. Similarly, the translational distance model 208 can be configured to link data tiers included in the data tiers 212 output by the clustering module 204 to different time windows included in the time windows 214 output by the network connection weight module 206.

Figure 2B:
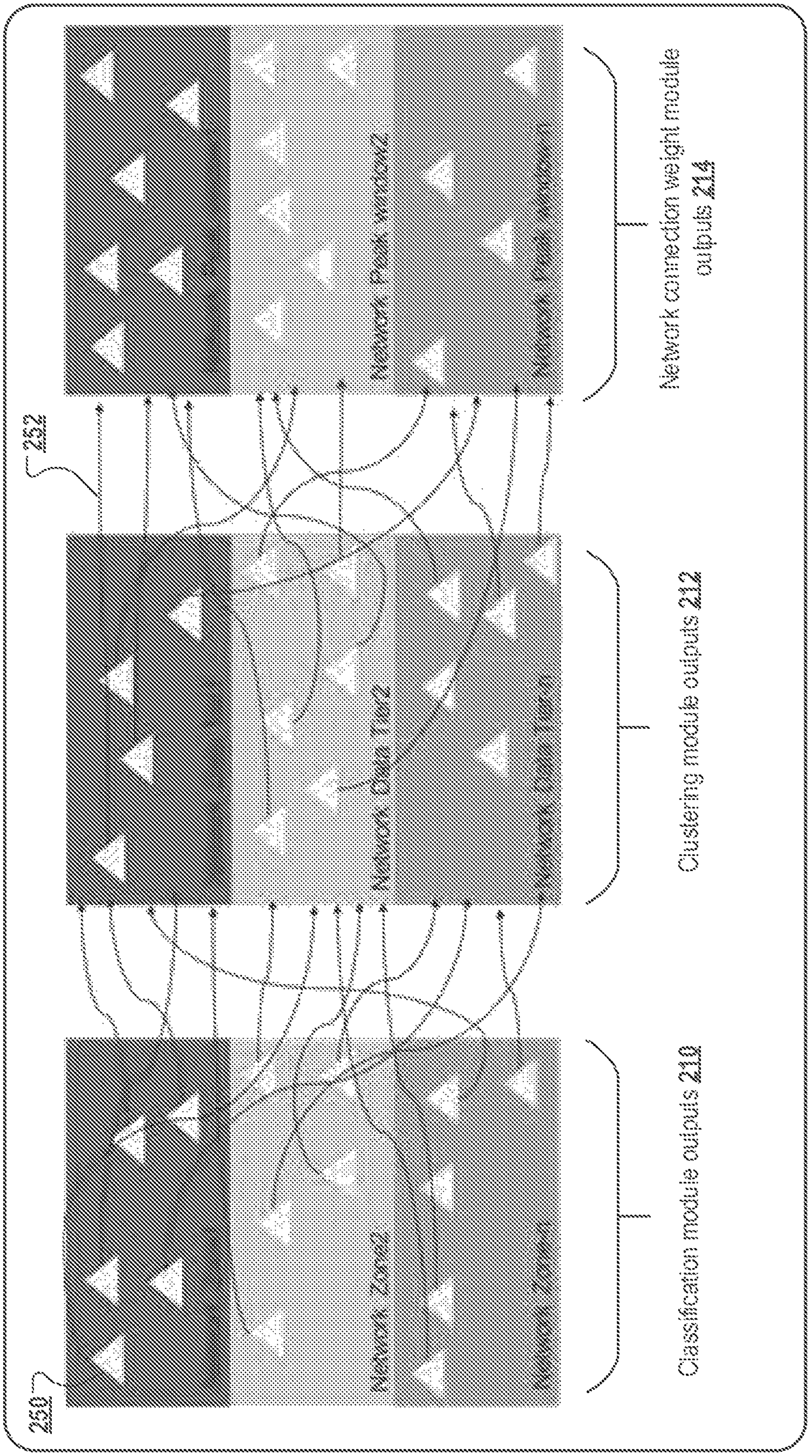
FIG. 2B is an illustration of relationships between classified and clustered data.

FIG. 2B is an illustration of example relationships between the classification module outputs 210, clustering module outputs 212, and network connection weight module outputs 214. In the illustration, triangles, e.g., triangle 250, represent network nodes. Arrows between triangles and data tiers or time windows, e.g., arrow 252, indicate relationships between respective network nodes and data tiers or time windows. For example, arrow 252 represents a relationship between a network node in data tier 1 with time window 1. As shown, each network zone may be part of a different data and corresponding time window cluster. The classification module outputs 210, clustering module outputs 212, and network connection weight module outputs 214 can be represented as matrices similar to matrices (1)-(4) below (referred to herein as a zone knowledge graph matrix, data tier knowledge graph matrix, and time window knowledge graph matrix, respectively.) These matrices have a same structure (e.g., size and ordering according to nodes) as matrices (1)-(4), where an entry "1" indicates that nodes have a common connection, and an entry "0" indicates that nodes do not have a common connection. For example, say node A is in zone Z1, data tier D2, and time window T2. Say node B is also in zone Z1 but is in data tier D1 and time window T1. Then a connection exists from Z1 to D2 to T1. That is, T1 is a common connection between nodes A and B. Therefore, in the zone knowledge graph matrix, the entry corresponding to node A,B is 1.

Returning to FIG. 2A, the network invariant analyzer 102 is configured to combine the classification module outputs 210, clustering module outputs 212, network connection weight module outputs 214, and translational distance model outputs 216 and generate, as output, a knowledge graph 218 that represents the information included in the classification module outputs 210, clustering module outputs 212, network connection weight module outputs 214, and translational distance model outputs 216. For example, as shown in FIG. 2A, the knowledge graph can include multiple vertices that represent network nodes, zones, data tiers, or time windows. Edges between vertices represent relationships between the vertices, where the relationships are labelled according to the type of relationship. For example, the edge between "node n" and "zone 3" indicates that node n belongs to zone 3.

The classification module outputs 210, clustering module outputs 212, network connection weight module outputs 214, translational distance model outputs 216, and generated knowledge graph 218 can be stored in a network variants database, as described above with reference to FIG. 1.

Figure 3:
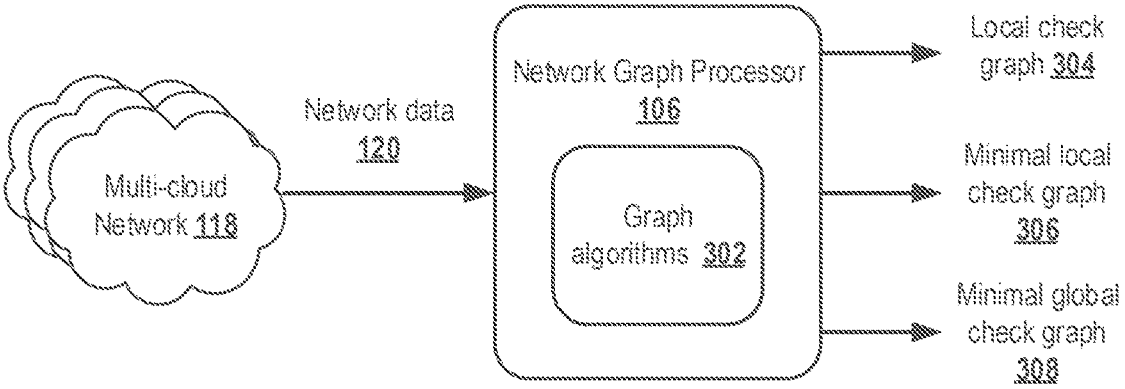
FIG. 3 is a block diagram of an example network graph processor.

FIG. 3 is a block diagram of an example network graph processor 106. As described above with reference to FIG. 1, the example network graph processor 106 is configured to receive network data 120 from a multi-cloud network 118. The network graph processor 106 is configured to apply graph algorithms 302 to the network data 120 to generate a local check graph 304, a minimal local check graph 306, and a minimal global check graph 308 for the multi-cloud network 118. The graph algorithms 302 can include, e.g., clustering algorithms, partitioning algorithms, breadth first search algorithms, and shortest path algorithms.

For example, the network graph processor 106 can be configured to process the network data 120 to generate a graph that represents the full network (referred to herein as a "full graph"). In this full graph, nodes represent physical or virtual machines in the network. Edges between nodes represents the connectivity between two physical or virtual machines. A node is a source node if data transmitted through the network originates at the node. A node is a target node if data transmitted through the network terminates at the node. A node is a communication node if data transmitted from a source node passes through the node before it arrives at the target node. These node properties can be used to define a communication matrix for the network.

Figure 4A:
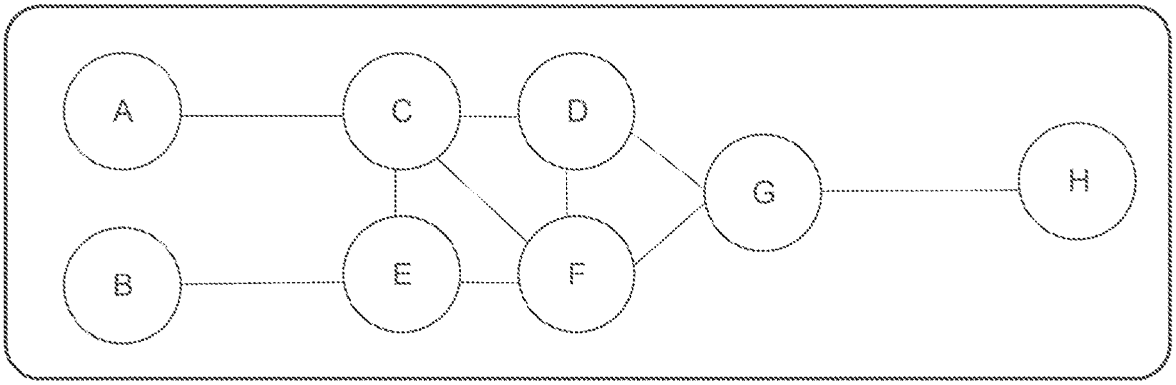
FIG. 4A shows a full graph for an example network.

FIG. 4A shows an example full graph that represents a network. In this example, the network includes eight nodes A-H. However, this is for illustrative purposes only and in real world applications the network would include a significantly larger number of nodes. A matrix representation of the example full graph shown in FIG. 4A is given by (1)

| | A | B | C | D | E | F | G | H |
|---|---|---|---|---|---|---|---|---|
| A | 1 | 0 | 1 | 0 | 0 | 0 | 0 | 0 |
| B | 0 | 1 | 0 | 0 | 1 | 0 | 0 | 0 |
| C | 1 | 0 | 1 | 1 | 1 | 1 | 0 | 0 |
| D | 0 | 0 | 1 | 1 | 0 | 1 | 1 | 0 |
| E | 0 | 0 | 1 | 0 | 1 | 1 | 0 | 0 |
| F | 0 | 0 | 1 | 1 | 1 | 1 | 1 | 0 |
| G | 0 | 0 | 0 | 1 | 0 | 1 | 1 | 1 |
| H | 0 | 0 | 0 | 0 | 0 | 0 | 1 | 1 |

where an entry "0" indicates that no direct connection exists between corresponding nodes and an entry "1" indicates that a direct connection exists between corresponding nodes.

Returning to FIG. 3, the network graph processor 106 can be configured to apply a graph clustering algorithm to the full graph (or data representing the full graph, e.g., the communication matrix) to identify nodes in the full graph that belong to a same cluster. In some implementations the clustering algorithm can also use the network data 120 to identify nodes that belong to a same cluster, e.g., node IP or MAC addresses, associated routers, or locations as specified by the network data 120. The number of clusters can depend on properties of the multi-cloud network 118, e.g., network size, complexity and configuration.

The network graph processor 106 can then apply a graph partitioning algorithm to partition the full graph into multiple disjoint subgraphs by removing graph edges that cross the clusters. The resulting graph is referred to herein as a local check graph. The network graph processor 106 is configured to provide data representing the local check graph as output data 304.

Figure 4B:
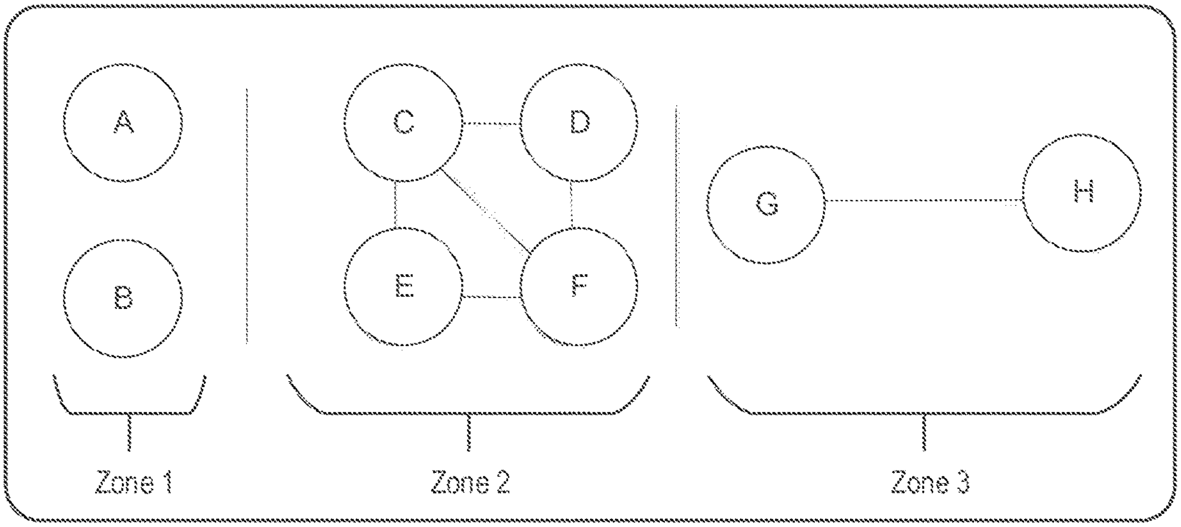
FIG. 4B shows an example local check graph.

FIG. 4B shows an example local check graph for the full graph shown in FIG. 4A. In this example, the clustering algorithm implemented by the network graph processor 106 has clustered the nodes into three clusters, however this is a non-limiting example and a larger number of clusters can be used. In this example, the edges that connected nodes A and C, B and E, D and G, and F and G have been removed, since these edges crossed clusters. A matrix representation of the example local check graph shown in FIG. 4B is given by (2)

| | A | B | C | D | E | F | G | H |
|---|---|---|---|---|---|---|---|---|
| A | 1 | 0 | 0 | 0 | 0 | 0 | 0 | 0 |
| B | 0 | 1 | 0 | 0 | 0 | 0 | 0 | 0 |
| C | 0 | 0 | 1 | 1 | 1 | 1 | 0 | 0 |
| D | 0 | 0 | 1 | 1 | 0 | 1 | 0 | 0 |
| E | 0 | 0 | 1 | 0 | 1 | 1 | 0 | 0 |
| F | 0 | 0 | 1 | 1 | 1 | 1 | 0 | 0 |
| G | 0 | 0 | 0 | 0 | 0 | 0 | 1 | 1 |
| H | 0 | 0 | 0 | 0 | 0 | 0 | 1 | 1 |

where an entry “0” indicates that no direct connection exists between corresponding nodes and an entry “1” indicates that a direct connection exists between corresponding nodes.

Returning to FIG. 3, the network graph processor 106 can also be configured to apply a graph algorithm, e.g., a graph traversal algorithm, to identify a minimum set of edges needed to connect (directly or indirectly, e.g., via a path of edges) all nodes (that were connected in the full graph) in the local check graph. The network graph processor 106 can then apply a partitioning algorithm to remove edges in the local check graph that are not included in the minimum set of edges. The resulting graph is referred to herein as a minimal local check graph. The network graph processor 106 is configured to provide data representing the minimal local check graph as output data 306.

Figure 4C:
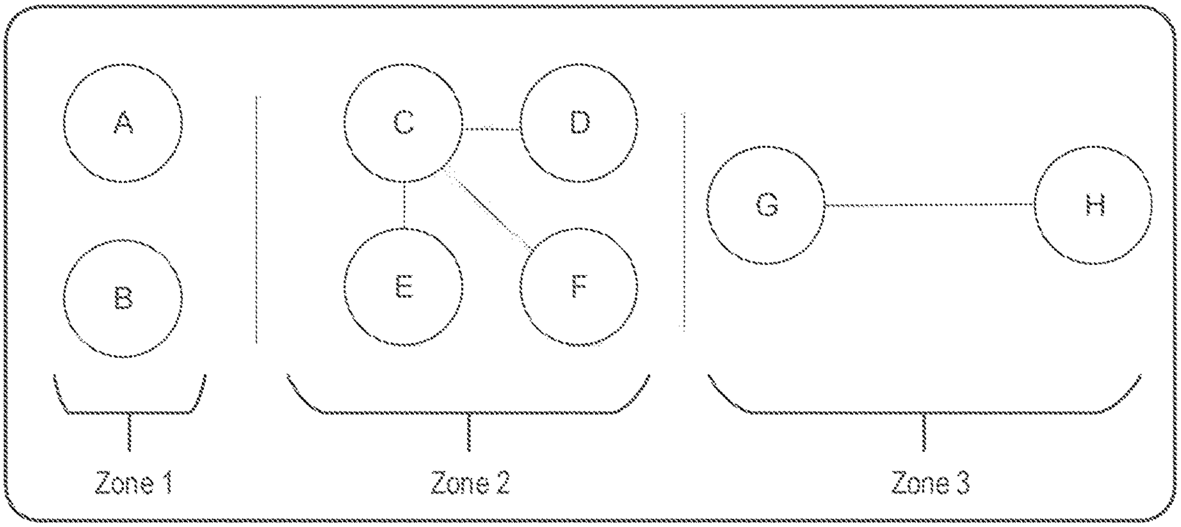
FIG. 4C shows an example minimal local check graph.

FIG. 4C shows an example minimal local check graph for the full graph shown in FIG. 4A. In this example, the network graph processor 106 identified the minimum set of edges needed to connect all nodes in the local check graph as the set of edges between nodes C and D, C and E, C and F, and G and H. Therefore, edges between nodes E and F and between nodes D and F have been removed. A matrix representation of the example minimal local check graph shown in FIG. 4C is given by (3)

| | *A* | *B* | *C* | *D* | *E* | *F* | *G* | *H* |
|---|---|---|---|---|---|---|---|---|
| *A* | 1 | 0 | 0 | 0 | 0 | 0 | 0 | 0 |
| *B* | 0 | 1 | 0 | 0 | 0 | 0 | 0 | 0 |
| *C* | 0 | 0 | 1 | 1 | 1 | 1 | 0 | 0 |
| *D* | 0 | 0 | 1 | 1 | 0 | 0 | 0 | 0 |
| *E* | 0 | 0 | 1 | 0 | 1 | 0 | 0 | 0 |
| *F* | 0 | 0 | 1 | 0 | 0 | 1 | 0 | 0 |
| *G* | 0 | 0 | 0 | 0 | 0 | 0 | 1 | 1 |
| *H* | 0 | 0 | 0 | 0 | 0 | 0 | 1 | 1 |

where an entry “0” indicates that no direct connection exists between corresponding nodes and an entry “1” indicates that a direct connection exists between corresponding nodes.

Returning to FIG. 3, the network graph processor 106 can also be configured to apply a graph algorithm to identify edges required to provide inter-cluster connectivity between the clustered nodes in the full graph. The network graph processor 106 can then remove edges in the full graph that are not included in the identified edges. The resulting graph is referred to herein as a minimal global check graph. The network graph processor 106 is configured to provide data representing the minimal global check graph as output data 308.

Figure 4D:
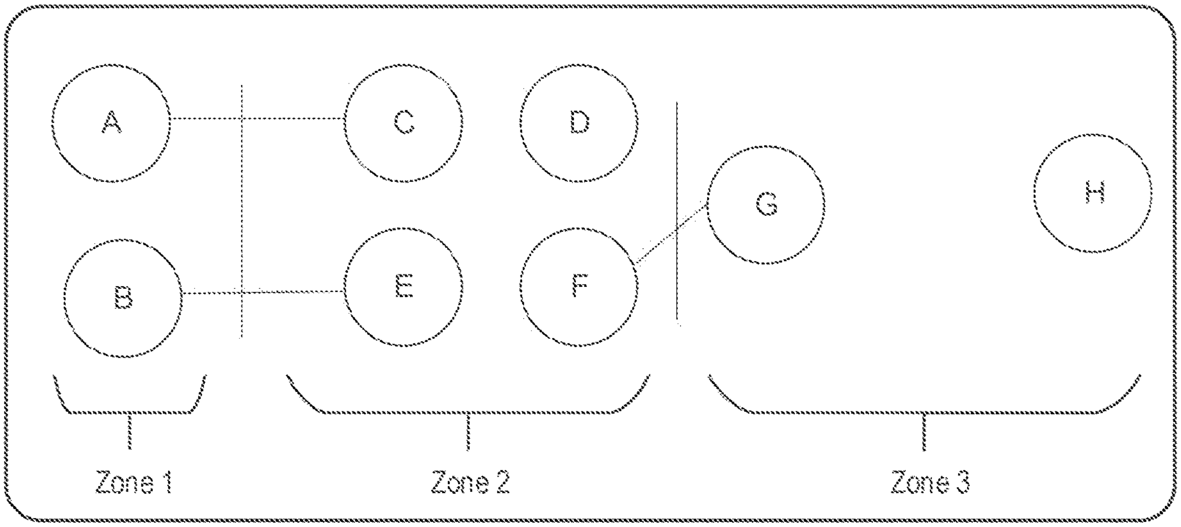
FIG. 4D shows an example minimal global check graph

FIG. 4D shows an example minimal global check graph for the local check graph shown in FIG. 4B. In this example, the network graph processor 106 identified the edges required to provide inter-cluster connectivity between the clustered nodes in the local check graph as edges that connect nodes A and C, B and E, and F and G (where two edges are required between clusters 1 and 2 because nodes A and B are not connected to each other). A matrix representation of the example minimal global check graph shown in FIG. 4D is given by (4)

| | *A* | *B* | *C* | *D* | *E* | *F* | *G* | *H* |
|---|---|---|---|---|---|---|---|---|
| *A* | 1 | 0 | 1 | 0 | 0 | 0 | 0 | 0 |
| *B* | 0 | 1 | 0 | 0 | 1 | 0 | 0 | 0 |
| *C* | 1 | 0 | 1 | 0 | 0 | 0 | 0 | 0 |
| *D* | 0 | 0 | 0 | 0 | 0 | 0 | 0 | 0 |
| *E* | 0 | 1 | 0 | 0 | 1 | 1 | 0 | 0 |
| *F* | 0 | 0 | 0 | 0 | 0 | 1 | 1 | 0 |
| *G* | 0 | 0 | 0 | 0 | 0 | 1 | 1 | 0 |
| *H* | 0 | 0 | 0 | 0 | 0 | 0 | 0 | 0 |

where an entry “0” indicates that no direct connection exists between corresponding nodes and an entry “1” indicates that a direct connection exists between corresponding nodes.

Returning to FIG. 3, the network graph processor 106 can provide data representing the local check graph 304, the minimal local check graph 306, and the minimal global check graph 308 to the quantum machine learning decision engine 110, as described above with reference to FIG. 1.

Figure 5:
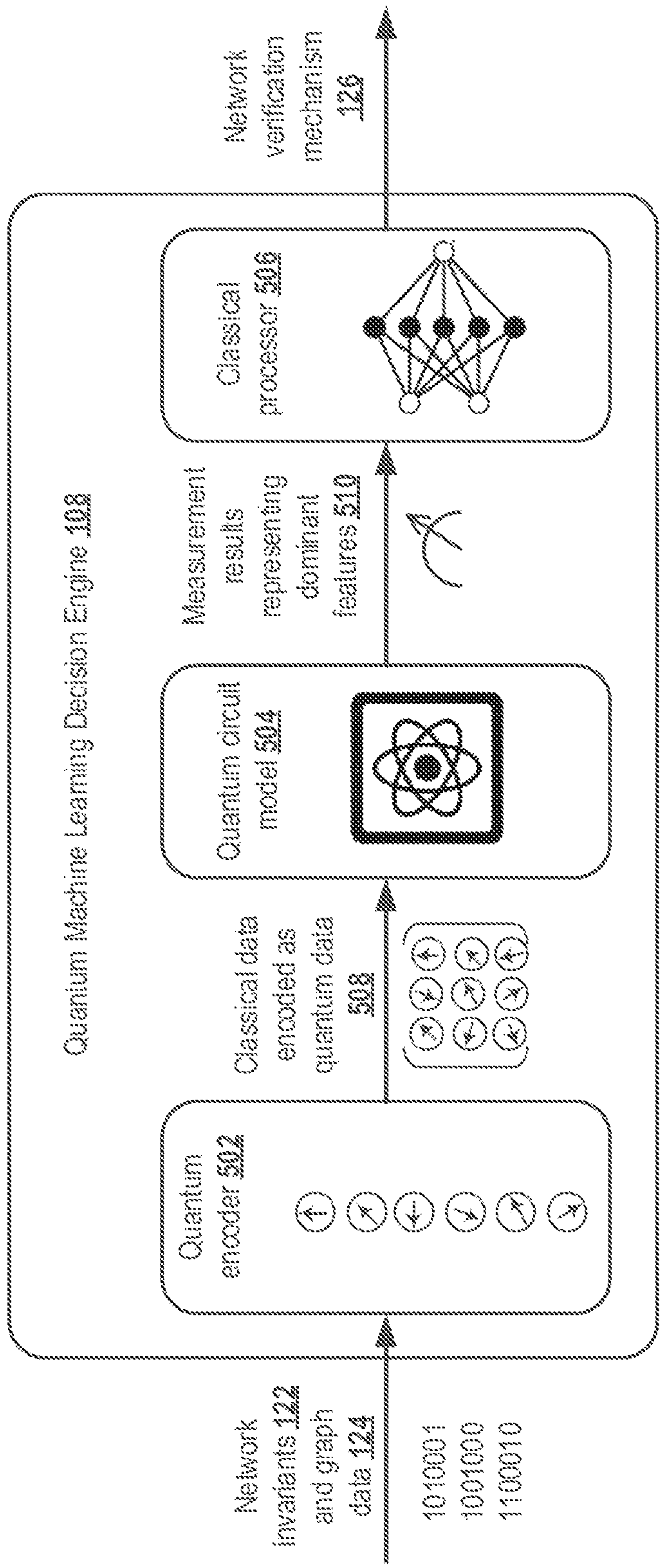
FIG. 5 is a block diagram of an example quantum machine learning decision engine.

FIG. 5 is a block diagram of an example quantum machine learning decision engine 108. The example quantum machine learning decision engine 108 includes a quantum encoder 502, a quantum circuit model 504, and a classical processor 506. The quantum machine learning decision engine 108 is an example of a quantum computing system implemented as computer programs on one or more classical and quantum devices in one or more locations, in which the systems, components, and techniques described in this specification can be implemented. Components of the quantum machine learning decision engine 108 can be in data communication with each other, e.g., through a communication network such as a local area network or wide area network.

The quantum machine learning decision engine 108 is configured to receive as input graph data 124, e.g., graph data representing a local check graph, minimal local check graph, and minimal global check graph for a multi-cloud network. The quantum machine learning decision engine 108 is also configured to receive network invariants 122, e.g., graph data representing a knowledge graph. The quantum machine learning decision engine 108 therefore receives six different dimensions of classical data—a local check graph, minimal local check graph, global local check graph, network zone data (as output by the classification module 202 of FIG. 2), network data tier data (as output by the clustering module 204 of FIG. 2), and network time window data (as output by the network connection weight module 206 of FIG. 2).

The quantum encoder 502 is a quantum computing device that is configured to perform quantum computations to encode the classical input data 122 and 124 as quantum data 508. For example, the quantum encoder 502 can be configured to apply a quantum data encoding circuit to a register of initialized qubits to prepare a quantum state that encodes information included in the classical input data 122 and 124, where the quantum data encoding circuit is determined based on the classical input data 122 and 124. The prepared quantum state can then be provided to the quantum circuit model 504, e.g., directly using teleportation techniques or indirectly by providing the quantum circuit model 504 with data specifying how to locally prepare the quantum state. An example process for encoding a classical data input as quantum data is described below with reference to FIG. 6.

The quantum circuit model 504 is a model that has been configured through training to perform quantum computations to extract dominant features from quantum data, e.g., quantum data 508, which in turn represents dominant features in the original network data received from the multi-cloud network. For example, the quantum circuit model 504 can be configured to implement a hybrid classical-quantum variational algorithm to train a parameterized quantum circuit (sometimes referred to as a variational quantum circuit) to extract dominant features from an input quantum state.

To implement the hybrid classical-quantum variational algorithm, a variational ansatz is selected and used to define the parameterized quantum circuit. The defined parameterized quantum circuit can be represented as a parameterized unitary operator $U(\theta)$ where $\theta$ represents a collection of circuit parameters, e.g., quantum gate parameters such as rotation angles. Then, for each input quantum state in a set of training examples, the parameterized quantum circuit is applied to the input quantum state. Application of the parameterized quantum circuit to the input quantum state maps the quantum state to an evolved quantum state according to the quantum gates and values of quantum gate parameters included in the parameterized quantum circuit. Application of the parameterized quantum circuit introduces quantum properties such as superposition, entanglement, and quantum parallelism. The evolved quantum state can then be measured on an observable to obtain an expectation value of the observable. The expectation value of the observable is dependent on the current values of the circuit parameters. The expectation value of the observable can be provided to a classical optimizer to compute a loss function which is optimized by updating the values of the circuit parameters. The observable and loss function are chosen such that the minimum of the loss function (evaluated at the expectation value of the observable) corresponds to a solution to the task, e.g., encodes information that represents dominant features in the input quantum state.

Once trained, the quantum circuit model 504 is configured to receive the quantum data 508 and repeatedly apply the trained parameterized quantum circuit to the quantum data 508 to obtain respective output quantum states. The quantum circuit model 504 is configured to measure the output quantum states to obtain measurement results 510. The measurement results 510 encode information that represents dominant features of the quantum data 508 (and therefore the dominant features of the network data obtained from the multi-cloud network).

The classical processor 506 is configured to receive the measurements results that represent dominant features in the quantum data 510. Example dominant features include network traffic patterns, resource utilization, latency, packet loss, time of transmission, inter-zone connection, etc. The classical processor 506 is configured to process the data 510 to select one or more appropriate verification mechanisms for the network 126. For example, the classical processor 506 can include a machine learning model, e.g., a decision engine, that has been configured through training to process input network features and select verification mechanisms from a set of verification mechanisms that are most likely to improve the operation of the multi-cloud network, e.g., maintain network invariants. Example network verification mechanisms include mechanisms that list of services active, list of forwarding rules in SDN router, monitor the status of network nodes, check data exchange patterns or data peak windows.

Figure 6:
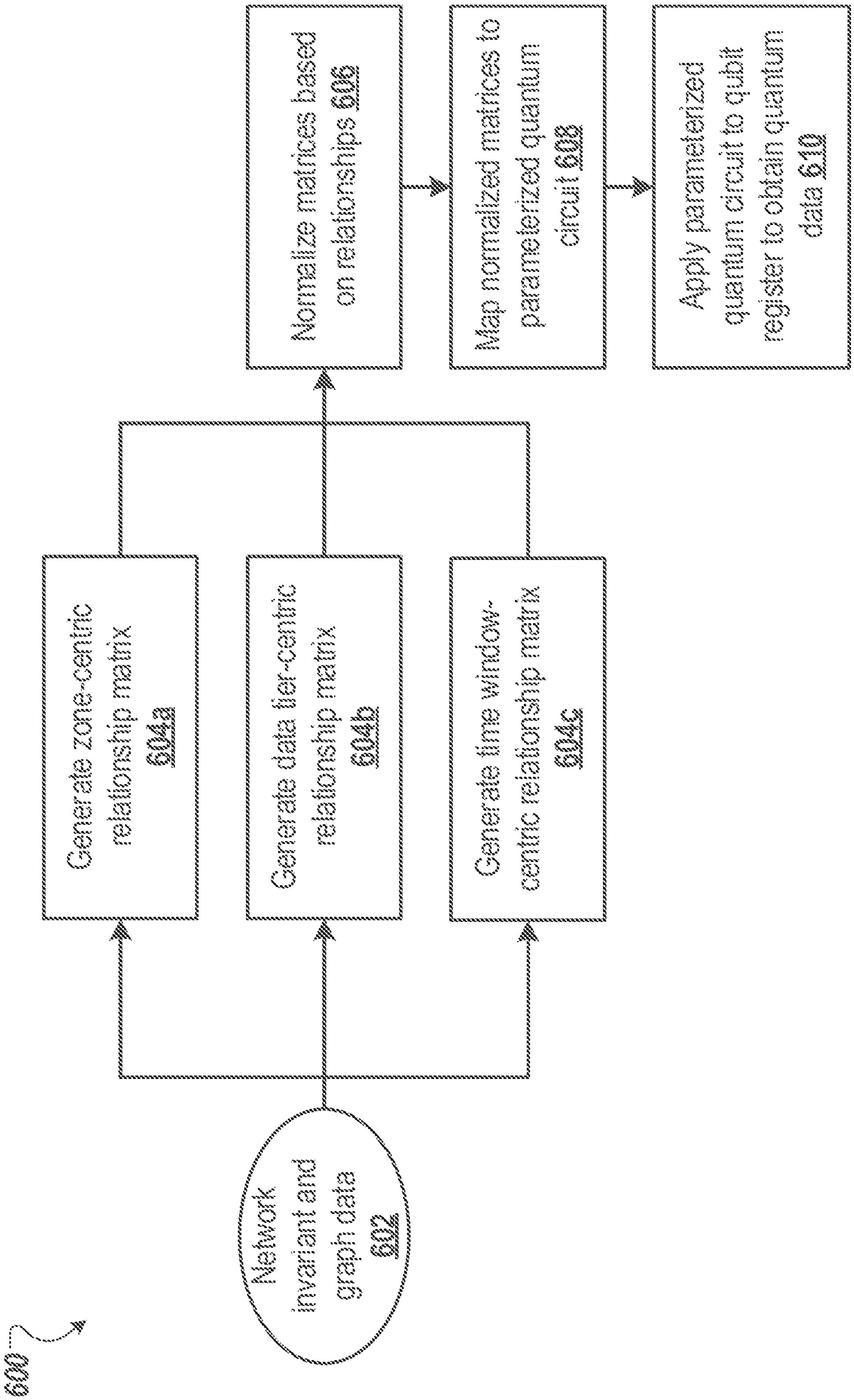
FIG. 6 is a flow diagram of an example process for encoding a classical data input as quantum data.

FIG. 6 is a flowchart of an example process 600 for encoding a classical data input as quantum data. For convenience, the process 600 will be described as being performed by a system of one or more classical and quantum computing devices located in one or more locations. For example, the quantum encoder 502 of FIG. 5, appropriately programmed in accordance with this specification, can perform example process 600.

The system receives a data input that includes network invariant data and graph data (step 602). For example, as described above with reference to FIG. 1, the network invariant data can include data that specifies a knowledge graph that includes multiple vertices that represent network nodes, zones, data tiers, or time windows and multiple edges between vertices that represent relationships between the vertices, where the relationships are labelled according to the type of relationship. For example, the network invariant data can include data that specifies a zone knowledge graph matrix, data tier knowledge graph matrix, and time window knowledge graph matrix. The graph data can include data that specifies matrix representations of a local check graph, a minimal local check graph, and a minimal global check graph for the network.

Figure 7A:
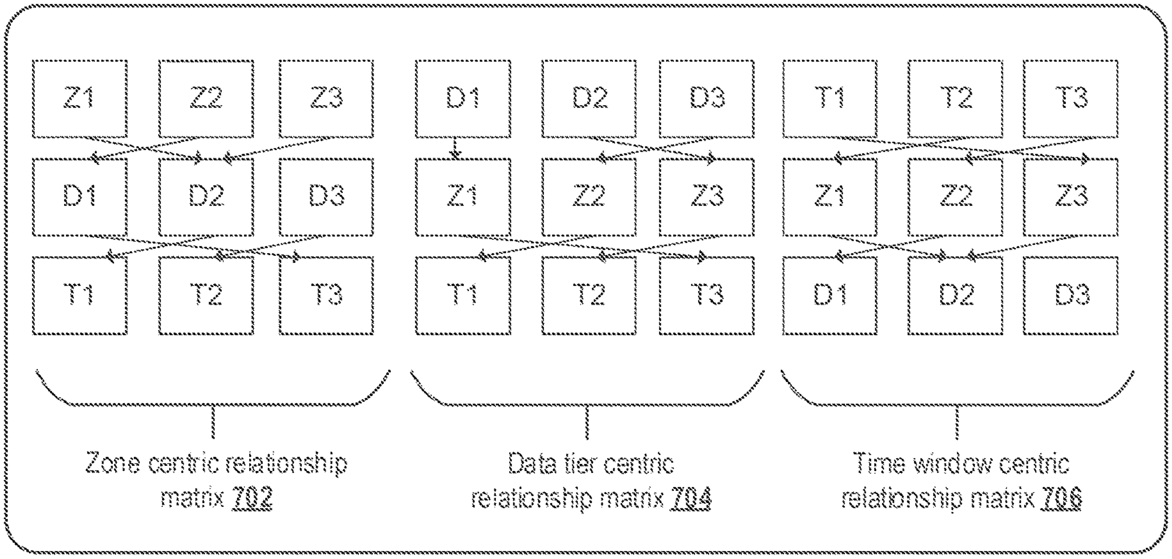
FIG. 7A shows example zone-centric, data tier-centric, and time window-centric matrices.

The system generates a zone-centric relationship matrix using the network invariant data (step 604*a*). The system also generates a data tier-centric relationship matrix using the network invariant data (step 604*b*). The system also generates a time window-centric relationship matrix using the network invariant data (step 604*c*). Example zone-centric, data tier-centric, and time window-centric matrices are shown in FIG. 7A. In FIG. 7A, Z1-Z3 represent example zones, D1-D3 represent example data tiers, and T1-T3 represent example time windows. In the zone-centric relationship matrix, matrix elements corresponding to zones are located in the top row of the matrix. Similarly, in the data tier-centric relationship matrix and time window-centric relationship matrix, matrix elements corresponding to data tiers and time windows are located in the top row of the matrix, respectively. Matrix elements are linked based on dependencies between the elements, e.g., zone Z1 is linked to data tier 2 if one or more nodes in zone Z1 sends data as per data tier 2. The matrices can also be represented in similar form to matrices (1)-(4) above, where the matrices have a same structure (e.g., size and ordering according to nodes) and an entry "1" indicates that nodes have a same zone, data tier, or time window, respectively, and an entry "0" indicates that nodes have a different one, data tier, or time window, respectively.

Figure 7B:
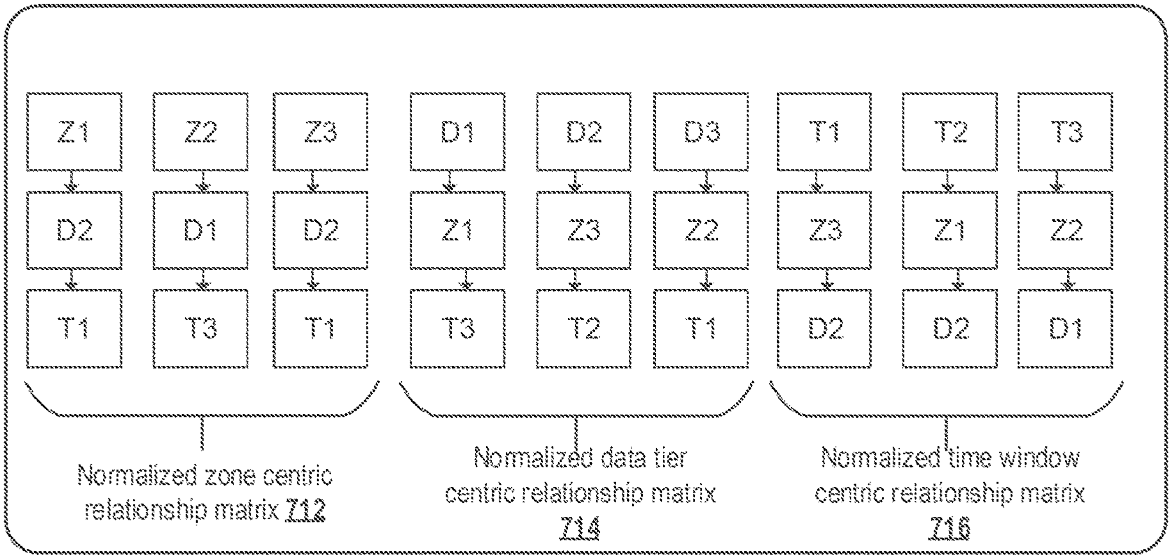
FIG. 7B shows example normalized zone-centric, data tier-centric, and time window-centric matrices.

The system normalizes the matrices generates at steps 604*a-c* based on the relationships represented by the matrices (step 606). Example normalized zone-centric, data tier-centric, and time window-centric matrices are shown in FIG. 7B. In this context, a normalized matrix is understood to refer to a matrix where the matrix elements have been reorganized and aligned based on dependencies between the matrix elements.

The system maps the network invariant data, graph data, and normalized matrices to a parameterized quantum circuit (step 608). Parameters of the quantum circuit correspond to entries of each of the zone knowledge graph matrix, data tier knowledge graph matrix, time window knowledge graph matrix, local check graph, minimal local check graph, minimal global check graph, zone-centric relationship matrix, data tier-centric relationship matrix, and time window centric relationship matrix. For example, the system can compose the local check graph, minimal local check graph, minimal global check graph, zone-centric relationship matrix, data tier-centric relationship matrix, time window-centric relationship matrix, the zone knowledge graph matrix, data tier knowledge graph matrix, and time window knowledge graph matrix to obtain a final matrix that is mapped to a parameterized quantum circuit. In some implementations, the system can perform the below operations:

$$QC\_G := QC1.compose(QC2).compose(QC3)$$

$$QC\_K := QC4.compose(QC5).compose(QC6)$$

$$QC\_R := QC7.compose(QC8).compose(QC9)$$

$$QC\_C := QC\_K.compose(QC\_R)$$

$$QC\_Final := QC\_G.compose(QC\_C)$$

where QC1 represents the matrix representation of the local check graph, QC2 represents the matrix representation of the minimal local check graph, QC3 represents the matrix representation of the minimal global check graph, QC4 represents the zone centric relationship matrix, QC5 represents the data tier centric relationship matrix, QC6 represents the time window centric relationship matrix, QC7 represents the zone knowledge graph matrix, QC8 represents the data tier knowledge graph matrix, and QC9 represents the time window knowledge graph matrix.

The mapping used by the system can be defined in advance and vary, e.g., depending on what type of operations/gates the quantum computer can perform. The parameterized quantum circuit can be used to map the matrices to a quantum state. This can be achieved by encoding the matrices, e.g., final matrices, as unitary matrices in the quantum circuit. To map the matrices to a quantum circuit, the system can perform the following steps. The system can decompose the matrices into a series of quantum operations, e.g., rotations and reflections, that can be implemented in a quantum circuit. The system can then encode the operations as quantum gates, where each operation in the decomposition is represented by a quantum gate in the quantum circuit. For example, rotations can be represented by respective gates and reflections can be represented by respective reflection gates. The system can then add parameters to the gates. In a parameterized quantum circuit, the parameters in the gates can be adjusted to control the behavior of the circuit. In this case, the parameters can be set to encode the values in the matrices. The system can then build the quantum circuit, where the quantum gates are arranged in a specific order to form the circuit. The input to the circuit is initialized to the zero state and the final state of the circuit represents the target quantum state. Once the circuit has been built, it can be executed on a quantum computer to produce the desired quantum state. This quantum state can then be used for various quantum algorithms, such as quantum machine learning or quantum optimization.

The relationships in the matrices can be mapped to the quantum circuit through the choice of quantum gates and their parameters. Each matrix element represents a relationship between the quantum states, and these relationships can be encoded into the quantum circuit through the choice of quantum gates and their parameters. For example, if a matrix element represents a rotation, it can be encoded as a rotation gate with an angle that corresponds to the magnitude of the rotation. If a matrix element represents a reflection, it can be encoded as a reflection gate. In general, the relationships in the matrices are captured by the unitary operations in the quantum circuit, which are implemented as sequences of quantum gates with adjustable parameters. The parameters of the gates can be optimized to maximize the similarity between the desired quantum state and the final state of the quantum circuit. The mapping from the relationships in the matrices to the quantum circuit is not unique and there can be multiple quantum circuits that implement the same relationships. The choice of the quantum circuit depends on the specific requirements of the quantum algorithm and the hardware being used.

The system applies the parameterized quantum circuit to a register of initialized qubits to prepare a quantum state that encodes the input data received at step 602 (step 610). The prepared quantum state (or data specifying how to prepare the quantum state) is referred to herein as a quantum data encoding of the classical input data.

Figure 8:
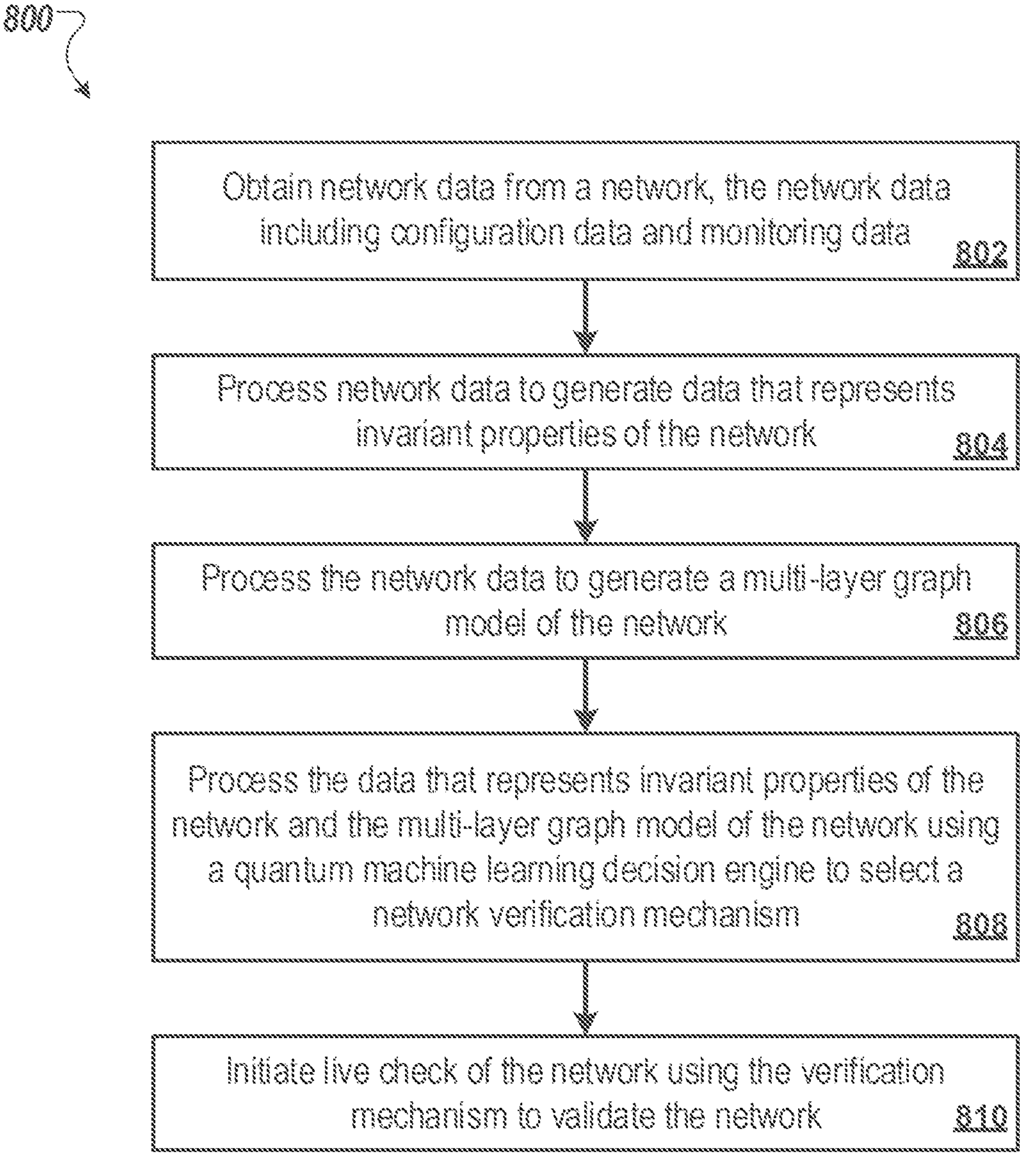
FIG. 8 is a flowchart of an example process for verifying a network.

FIG. 8 is a flowchart of an example process 800 for verifying a network. For convenience, the process 800 will be described as being performed by a system of one or more classical and quantum computing devices located in one or more locations. For example, the quantum network verification system 100 of FIG. 1, appropriately programmed in accordance with this specification, can perform example process 800.

The system obtains network data from the network (step 802). The network data comprises network monitoring data and network configuration data.

The system processes the network data to generate data that represents invariant properties of the network (step 804). In some implementations the data that represents invariant properties of the network can be clustered in three dimensions, where the dimensions include network zones, network data tiers, and network time windows. For example, to process the network data to generate data that represents invariant properties of the network the system can classify nodes of the network as belonging to one of multiple network zones, classify nodes of the network as belonging to one of multiple network data tiers, and identify connectivity patterns of each node in the network with respect to multiple predefined time windows.

In some implementations the data that represents invariant properties of the network can be represented as knowledge graph, where vertices included in the knowledge graph represent network nodes, zones, network data tiers, or network connectivity in predefined time windows, and edges between vertices represent relationships between the vertices. To generate the knowledge graph, the system can process data that represents the classified nodes and identified connectivity patterns using a translational distance model to identify relationships between the classified nodes and identified connectivity patterns. The system can then generate a knowledge graph using the classified nodes, identified connectivity patterns, and relationships between the classified nodes and identified connectivity patterns. Example operations performed by the system at step 804 are described above with reference to FIGS. 2A and 2B. A portion of an example knowledge graph is shown in FIG. 2A.

The system processes the network data using one or more graph algorithms to generate a multi-layer graph model of the network (step 806). The multi-layer graph model of the network can include one or more of: a local check graph, a minimal local check graph, and a minimal global check graph.

To generate a local check graph, the system can first generate a graph that represents the full network, where nodes in the graph represent physical or virtual machines included in the network and edges between nodes represent respective connectivities between physical or virtual machines. The system can then assign each node in the graph to a respective network zone of multiple network zones and partition the graph into multiple disjoint subgraphs, where each disjoint subgraph corresponds to a respective network zone. The partitioned graph is referred to herein as a local check graph.

To generate a minimal local check graph, the system can identify a minimum set of edges that connects all nodes in the graph that represents the full network and remove edges from the local check graph that are not included in the minimum set of edges. The resulting graph is referred to herein as a minimal local check graph.

To generate the minimal global check graph, the system can identify edges in the graph of the full network that provide inter-zone connectivity between the nodes in the graph and remove edges from the graph that are not included in the identified edges. The resulting graph is referred to herein as a minimal global check graph.

Example operations performed by the system at step 806 are described above with reference to FIG. 3. Example graphs that can be included in the multi-layer graph model are described above with reference to FIGS. 4A-D.

The system processes the data that represents invariant properties of the network and the multi-layer graph model of the network using a quantum machine learning decision engine to select one or more network verification mechanisms for the network (step 808). To process the data that represents invariant properties of the network and the multi-layer graph model of the network using the quantum machine learning decision engine, the system can first encode the data that represents invariant properties of the network and the multi-layer graph model of the network as quantum data. An example process for encoding such classical data as quantum data is described above with reference to FIG. 6.

The system can then apply a trained quantum circuit model to the quantum data to extract dominant features in the network data. In some implementations the quantum circuit model can include a parameterized quantum circuit that has been configured through training to extract dominant features from a data input using a hybrid classical-quantum variational algorithm. The system can then process data representing the dominant features in the network data using a trained classical machine learning model to select the network verification mechanisms. Example operations performed by the system at step 808 are described above with reference to FIGS. 5 and 6.

In some implementations the system may be a classical computing device and not include a quantum computing device that is required to perform some of the operations at step 808. In these implementations, the system can provide the data that represents invariant properties of the network and the multi-layer graph model of the network to an external quantum computing device. The system can then receive an output from the external quantum computing device, e.g., measurement results that encode the dominant features of the network data, and process the output using the trained classical machine learning model to select the network verification mechanisms.

The system initiates a live check of the network using the verification mechanisms to validate the network (step 810). In some implementations the system can receive network validation results of the live check of the network. The system can also infer a network status using the selected network verification mechanisms. The system can then generate a network verification output that indicates whether problems or failures still exist in the network using the network validation results of the live check and the inferred network status. The system can process the network verification output to determine whether to initiate one or more remedial actions on the network and, in response to determining that one or more remedial actions are required, initiate the one or more remedial actions. These additional steps can improve the likelihood that all or a majority of problems or failures occurring the multi-cloud network are resolved.

Figure 9:
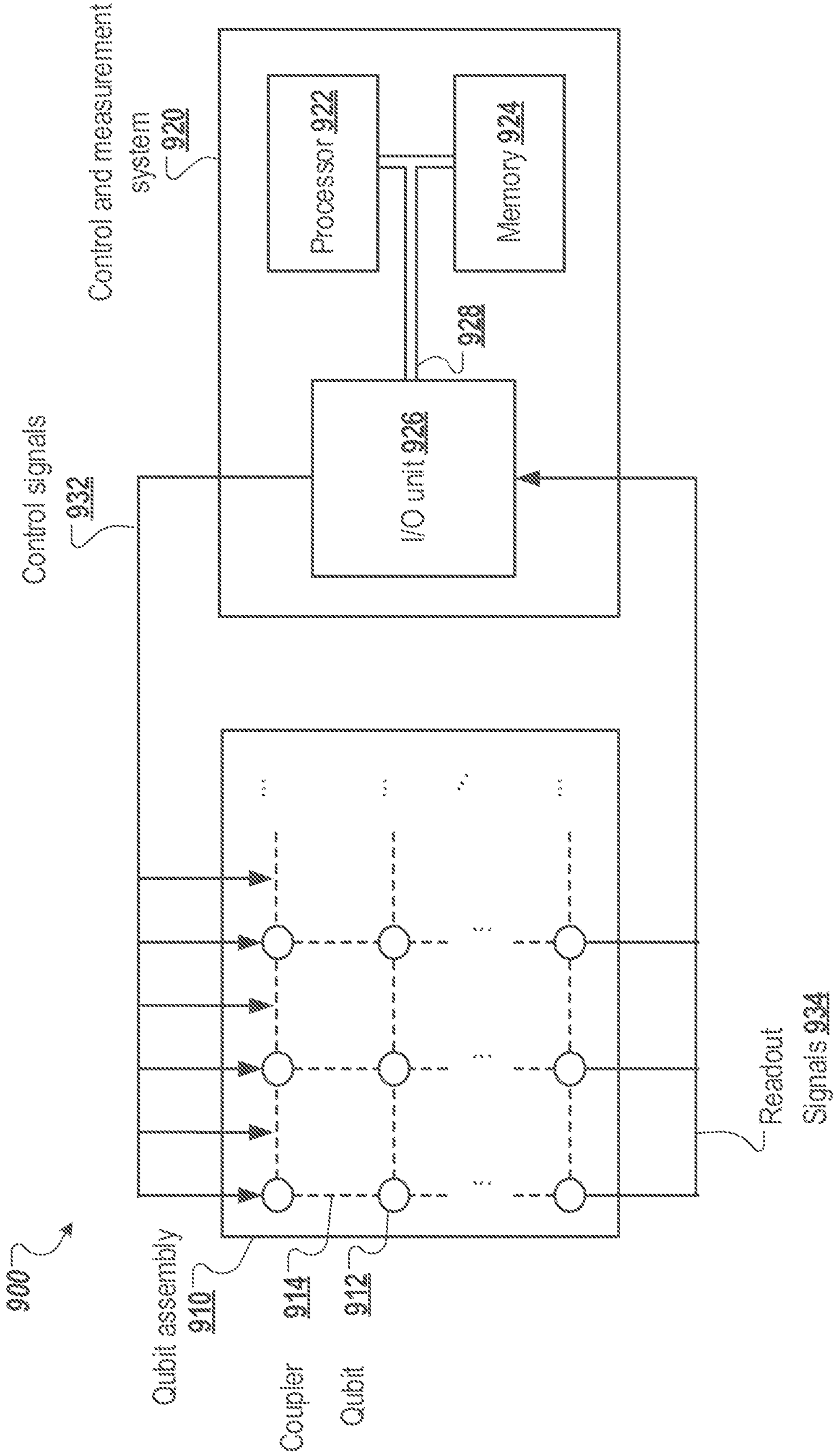
FIG. 9 shows an example an example quantum computing device that may be used to carry out the quantum computing methods described herein.

FIG. 9 is a block diagram of an example quantum computing device 900. The quantum computing device 900 can be used to perform the quantum computation operations described in this specification according to some implementations. The quantum computing device 900 is intended to represent various forms of quantum computing devices. The components shown here, their connections and relationships, and their functions, are exemplary only, and do not limit implementations of the inventions described and/or claimed in this document.

The quantum computing device 900 includes a qubit assembly 910 and a control and measurement system 920. The qubit assembly includes multiple qubits, e.g., qubit 912, that are used to perform algorithmic operations or quantum computations. While the qubits shown in FIG. 9 are arranged in a rectangular array, this is a schematic depiction and is not intended to be limiting. The qubit assembly 910 also includes adjustable coupling elements, e.g., coupler 914, that allow for interactions between coupled qubits. In the schematic depiction of FIG. 9, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a two-level quantum system or physical device having levels representing logical values of 0 and 1. The specific physical realization of the multiple qubits and how they interact with one another is dependent on a variety of factors including the type of the quantum computing device 900 or the type of quantum computations that the quantum computing device 900 is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by initializing the qubits in a selected initial state and applying a sequence of quantum logic gates to the qubits. Example quantum logic gates include single-qubit rotation gates, e.g., Pauli-X, Pauli-Y, Pauli-Z (also referred to as X, Y, Z), variations of the Pauli gates, e.g., $\sqrt{X}$, $\sqrt{Z}$, $\sqrt{Y}$ gates, Hadamard H and S gates, two-qubit gates, e.g., controlled-X, controlled-Y, controlled-Z (also referred to as CX, CY, CZ), CNOT and gates involving three or more qubits, e.g., Toffoli gates. The quantum logic gates include gate parameters, e.g., rotation angles, which are adjusted. A sequence of quantum logic gates forms a quantum circuit. The quantum logic gates can be implemented by applying control signals 932 generated by the control and measurement system 920 to the qubits and to the couplers.

For example, in some implementations the qubits in the qubit assembly 910 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 932 used depends on the physical realizations of the qubits. For example, the control signals may include RF or microwave pulses in an NMR or superconducting quantum computer system, or optical pulses in an atomic quantum computer system.

A quantum computation or algorithm can be completed by measuring the states of the qubits, e.g., using a quantum observable such as Z, using respective control signals 934. The measurements cause readout signals 934 representing measurement results to be communicated back to the measurement and control system 920. The readout signals 934 can include RF, microwave, or optical signals depending on the physical scheme for the quantum computing device 900 and/or the qubits. For convenience, the control signals 932 and readout signals 934 shown in FIG. 9 are depicted as addressing only selected elements of the qubit assembly (i.e. the top and bottom rows), but during operation the control signals 932 and readout signals 934 can address each element in the qubit assembly 910.

The control and measurement system 920 is an example of a classical computer system that can be used to perform various operations on the qubit assembly 910, as described above. The control and measurement system 920 includes one or more classical processors, e.g., classical processor 922, one or more memories, e.g., memory 924, and one or more I/O units, e.g., I/O unit 926, connected by one or more data buses, e.g., bus 926. The control and measurement system 920 can be programmed to send sequences of control signals 932 to the qubit assembly, e.g. to carry out a selected series of quantum gate operations, and to receive sequences of readout signals 934 from the qubit assembly, e.g. as part of performing measurement operations.

The processor 922 is configured to process instructions for execution within the control and measurement system 920. In some implementations, the processor 922 is a single-threaded processor. In other implementations, the processor 922 is a multi-threaded processor. The processor 922 is capable of processing instructions stored in the memory 924.

The memory 924 stores information within the control and measurement system 920. In some implementations, the memory 924 includes a computer-readable medium, a volatile memory unit, and/or a non-volatile memory unit. In some cases, the memory 924 can include storage devices capable of providing mass storage for the system 920, e.g. a hard disk device, an optical disk device, a storage device that is shared over a network by multiple computing devices (e.g., a cloud storage device), and/or some other large capacity storage device.

The input/output device 926 provides input/output operations for the control and measurement system 920. The input/output device 926 can include D/A converters, A/D converters, and RF/microwave/optical signal generators, transmitters, and receivers, whereby to send control signals 932 to and receive readout signals 1134 from the qubit assembly, as appropriate for the physical scheme for the quantum computer. In some implementations, the input/output device 926 can also include one or more network interface devices, e.g., an Ethernet card, a serial communication device, e.g., an RS-232 port, and/or a wireless interface device, e.g., an 802.11 card. In some implementations, the input/output device 926 can include driver devices configured to receive input data and send output data to other external devices, e.g., keyboard, printer and display devices.

Although an example control and measurement system 920 has been depicted in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Figure 10:
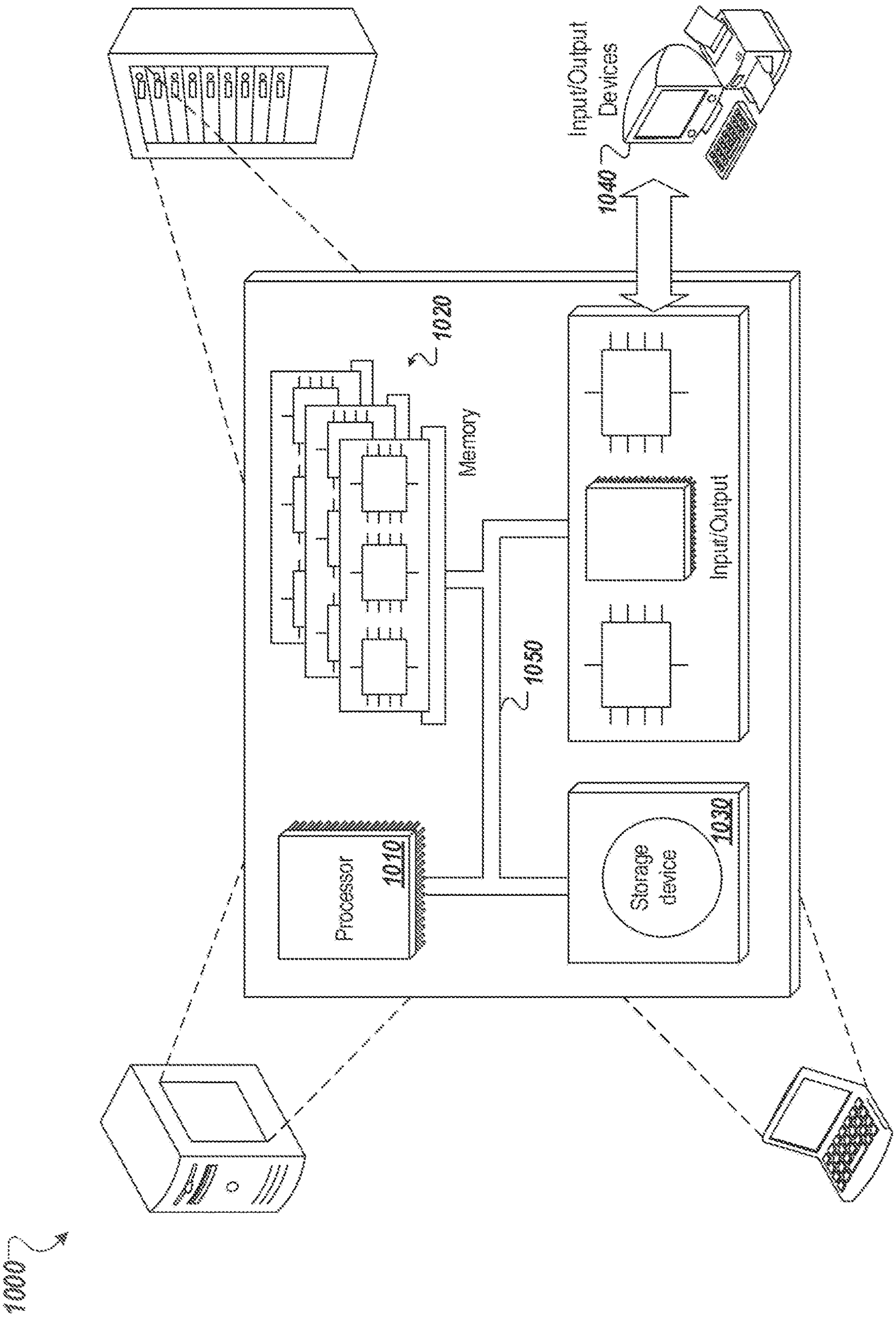
FIG. 10 shows an example classical processor that may be used to carry out the classical computing methods described herein.

FIG. 10 illustrates a schematic diagram of an exemplary generic classical processor system 1000. The system 1000 can be used for the classical operations described in this specification according to some implementations. The system 1000 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 1000 includes a processor 1010, a memory 1020, a storage device 1030, and an input/output device 1040. Each of the components 1010, 1020, 1030, and 1020 are interconnected using a system bus 1050. The processor 1010 may be enabled for processing instructions for execution within the system 1000. In one implementation, the processor 1010 is a single-threaded processor. In another implementation, the processor 1010 is a multi-threaded processor. The processor 1010 may be enabled for processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 may be enabled for providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively, or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in physical quantum systems, where the smallest non-trivial physical system is a qubit, i.e., a system that defines the unit of quantum information. It is understood that the term "qubit" encompasses all physical quantum systems or devices that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

The invention claimed is:

1. A method for verifying a network, the method comprising:

obtaining, by a classical computer, network data from the network, wherein the network data comprises network monitoring data and network configuration data;

processing, by the classical computer, the network data to generate data that represents invariant properties of the network;

processing, by the classical computer, the network data to generate a multi-layer graph model of the network;

processing, by a quantum computer, the data that represents invariant properties of the network and the multi-layer graph model of the network using a quantum machine learning decision engine to select one or more network verification mechanisms for the network, wherein processing the using the quantum machine learning decision engine comprises:

encoding the data that represents invariant properties of the network and the multi-layer graph model of the network as quantum data, wherein encoding the data comprises:

generating a zone-centric relationship matrix, a data tier-centric relationship matrix, and a time window centric relationship matrix using the invariant properties of the network and the multi-layer graph model of the network;

mapping the zone-centric relationship matrix, data tier-centric relationship matrix, and time window centric relationship matrix to a quantum circuit, wherein parameters of the quantum circuit correspond to entries of each of the zone-centric relationship matrix, data tier-centric relationship matrix, and time window centric relationship matrix; and applying the quantum circuit to a register of initialized qubits to prepare a quantum state that encodes the data that represents invariant properties of the network and the multi-layer graph model of the network;

applying a trained quantum circuit model to the quantum data to extract dominant features in the network data; and processing the dominant features in the network data using a trained classical machine learning model to select the network verification mechanisms; and initiating a live check of the network using the verification mechanisms to validate the network.

2. The method of claim 1, wherein the multi-layer graph model of the network comprises a local check graph, a minimal local check graph, and a minimal global check graph.

3. The method of claim 2, wherein processing the network data to generate the local check graph comprises:
generating a graph that represents the network, wherein nodes in the graph represent physical or virtual machines included in the network and edges between nodes represent respective connectivities between physical or virtual machines;
assigning each node in the graph to a respective network zone of multiple network zones; and
partitioning the graph into multiple disjoint subgraphs, wherein each disjoint subgraph corresponds to a respective network zone.

4. The method of claim 2, wherein processing the network data to generate the minimal local check graph comprises:
identifying a minimum set of edges that connects all nodes in the graph; and removing edges from the local check graph that are not included in the minimum set of edges.

5. The method of claim 2, wherein processing the network data to generate the minimal global check graph comprises:
identifying edges that provide inter-zone connectivity between the nodes in the graph; and
removing edges from the graph that are not included in the identified edges.

6. The method of claim 1, further comprising normalizing each of the zone-centric relationship matrix, data tier-centric relationship matrix, and time window centric relationship matrix, wherein the normalized zone-centric relationship matrix, data tier-centric relationship matrix, and time window centric relationship matrix are mapped to the quantum circuit.

7. The method of claim 6, normalizing each of the zone-centric relationship matrix, the data tier-centric relationship matrix, and the time window-centric relationship matrix by reorganizing matrix elements based on dependencies between the matrix elements such that the matrix elements are aligned according to the dependencies between network zones, data tiers, and time window.

8. The method of claim 1, wherein encoding the data that represents invariant properties of the network and the multi-layer graph model of the network as quantum data comprises:
applying a quantum data encoding circuit to a register of initialized qubits to prepare a quantum state that encodes information included in the data that represents invariant properties of the network and the multi-layer graph model of the network, wherein the quantum data encoding circuit is determined based on the data that represents invariant properties of the network and the multi-layer graph model of the network.

9. The method of claim 1, wherein the quantum circuit model comprises a parameterized quantum circuit that has been configured through training to extract dominant features from a data input using a hybrid classical-quantum variational algorithm.

10. The method of claim 1, wherein the data that represents invariant properties of the network is clustered in three dimensions, the dimensions comprising network zones, network data tiers, and network time windows.

11. The method of claim 10, wherein processing the network data to generate data that represents invariant properties of the network further comprises:
processing data representing the classified nodes and identified connectivity patterns using a translational distance model to identify relationships between the classified nodes and identified connectivity patterns; and
generating a knowledge graph using the classified nodes, identified connectivity patterns, and relationships between the classified nodes and identified connectivity patterns, wherein vertices included in the knowledge graph represent network nodes, zones, data tiers, or time windows and edges between vertices represent relationships between the vertices.

12. The method of claim 1, wherein the invariant properties of the network are represented as knowledge graph, wherein vertices included in the knowledge graph represent network nodes, zones, network data tiers, or network connectivity in predefined time windows, and edges between vertices represent relationships between the vertices.

13. The method of claim 1, wherein processing the network data to generate data that represents invariant properties of the network comprises:
classifying nodes of the network as belonging to one of multiple network zones;
classifying nodes of the network as belonging to one of multiple network data tiers; and
identifying connectivity patterns of each node in the network with respect to multiple predefined time windows.

14. The method of claim 1, further comprising:
receiving network validation results of the live check of the network;
inferring a network status using the selected network verification mechanisms;
generating a network verification output that indicates whether problems or failures still exist in the network using the network validation results of the live check and the inferred network status;
and processing the network verification output to determine whether to initiate one or more remedial actions on the network.

15. The method of claim 1, wherein selecting one or more network verification mechanisms for the network comprises:
categorizing the network verification mechanisms into live check mechanisms and inference mechanisms; and
assigning a proportion of the network verification mechanisms to live check and inference such that a subset of the network verification mechanisms is executed as live checks and a remaining subset is executed as inference.

16. A system comprising:
one or more classical processors; and
quantum computing hardware;
wherein the system is configured to perform operations comprising:
obtaining, by a classical computer, network data from a network, wherein the network data comprises network monitoring data and network configuration data;
processing, by the classical computer, the network data to generate data that represents invariant properties of the network;
processing, by the classical computer, the network data to generate a multi-layer graph model of the network;
processing, by a quantum computer, the data that represents invariant properties of the network and the multi-layer graph model of the network using a quantum machine learning decision engine to select one or more network verification mechanisms for the network, wherein processing the using the quantum machine learning decision engine comprises:

encoding the data that represents invariant properties of the network and the multi-layer graph model of the network as quantum data, wherein encoding the data comprises:

generating a zone-centric relationship matrix, a data tier-centric relationship matrix, and a time window centric relationship matrix using the invariant properties of the network and the multi-layer graph model of the network;

mapping the zone-centric relationship matrix, data tier-centric relationship matrix, and time window centric relationship matrix to a quantum circuit, wherein parameters of the quantum circuit correspond to entries of each of the zone-centric relationship matrix, data tier-centric relationship matrix, and time window centric relationship matrix; and applying the quantum circuit to a register of initialized qubits to prepare a quantum state that encodes the data that represents invariant properties of the network and the multi-layer graph model of the network;

applying a trained quantum circuit model to the quantum data to extract dominant features in the network data; and processing the dominant features in the network data using a trained classical machine learning model to select the network verification mechanisms; and initiating a live check of the network using the verification mechanisms to validate the network.

17. The system of claim 16, wherein processing the network data to generate data that represents invariant properties of the network comprises:

classifying nodes of the network as belonging to one of multiple network zones and one of multiple network data tiers;

identifying connectivity patterns of each node in the network with respect to multiple predefined time windows;

processing data representing the classified nodes and the identified connectivity patterns using a translational distance model to identify relationships between the classified nodes and the identified connectivity patterns; and generating a knowledge graph using the classified nodes, identified connectivity patterns, and relationships between the classified nodes and identified connectivity patterns, wherein vertices included in the knowledge graph represent network nodes, zones, data tiers, or time windows and edges between vertices represent relationships between the vertices.

18. The system of claim 16, wherein encoding the data that represents invariant properties of the network and the multi-layer graph model of the network as quantum data comprises:

applying a quantum data encoding circuit to a register of initialized qubits to prepare a quantum state that encodes information included in the data that represents invariant properties of the network and the multi-layer graph model of the network, wherein the quantum data encoding circuit is determined based on the data that represents invariant properties of the network and the multi-layer graph model of the network.

19. The system of claim 16, wherein the quantum circuit model comprises a parameterized quantum circuit that has been configured through training to extract dominant features from a data input using a hybrid classical-quantum variational algorithm.

20. The system of claim 16, wherein the invariant properties of the network are represented as knowledge graph, wherein vertices included in the knowledge graph represent network nodes, zones, network data tiers, or network connectivity in predefined time windows, and edges between vertices represent relationships between the vertices.

* * * * *